United States Patent
Olsson et al.

(10) Patent No.: US 10,880,792 B2
(45) Date of Patent: Dec. 29, 2020

(54) NODES AND METHOD FOR DETERMINING TARGET PLMN ID AND TARGET CELL ID

(71) Applicant: Telefonaktiebolaget LM Ericsson (publ), Stockholm (SE)

(72) Inventors: Lars-Bertil Olsson, Angered (SE); Peter Ramle, Mölnlycke (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 153 days.

(21) Appl. No.: 16/094,635

(22) PCT Filed: Sep. 17, 2018

(86) PCT No.: PCT/EP2018/075033
§ 371 (c)(1),
(2) Date: Oct. 18, 2018

(87) PCT Pub. No.: WO2019/091639
PCT Pub. Date: May 16, 2019

(65) Prior Publication Data
US 2019/0141586 A1    May 9, 2019

Related U.S. Application Data

(60) Provisional application No. 62/582,412, filed on Nov. 7, 2017.

(51) Int. Cl.
*H04W 36/00* (2009.01)
*H04W 72/08* (2009.01)
(Continued)

(52) U.S. Cl.
CPC ......... *H04W 36/0061* (2013.01); *H04W 8/26* (2013.01); *H04W 36/26* (2013.01);
(Continued)

(58) Field of Classification Search
CPC combination set(s) only.
See application file for complete search history.

(56) References Cited

U.S. PATENT DOCUMENTS

| | | |
|---|---|---|
| 8,036,654 B2 * | 10/2011 | Hind ............... H04W 48/18 455/432.1 |
| 9,253,747 B1 * | 2/2016 | Saleh ............... H04W 60/04 |

(Continued)

FOREIGN PATENT DOCUMENTS

WO    2004102927 A2    11/2004

OTHER PUBLICATIONS

Author Unknown, "Technical Specification Group Services and System Aspects; Network Sharing; Architecture and functional description (Release 14)," Technical Specification 23.251, Version 14.1.0, 3GPP Organizational Partners, Sep. 2017, 39 pages.

(Continued)

*Primary Examiner* — Yee F Lam
(74) *Attorney, Agent, or Firm* — Withrow & Terranova, PLLC

(57) ABSTRACT

The embodiments herein relate to a method implemented in radio access node. The radio access node receives a list of prioritized Public Land Mobile Network (PLMN) Identities (IDs). The list of prioritized PLMN IDs comprises a PLMN ID of a serving PLMN and one or more PLMN IDs for one or more PLMNs of one or more shared networks. The radio access node instructs the wireless device to search for suitable cells for handover on at least one PLMN identified in the list of prioritized PLMN IDs and receives a list of suitable cells for handover. The radio access node determines a target PLMN ID and a target cell ID based on the list of suitable cells and the list of prioritized PLMN IDs.

(Continued)

The radio access node initiates handover of the wireless device to a target cell identified by the target cell ID in the target PLMN.

20 Claims, 16 Drawing Sheets

(51) Int. Cl.
*H04W 8/26* (2009.01)
*H04W 76/25* (2018.01)
*H04W 36/26* (2009.01)
*H04W 48/18* (2009.01)
*H04W 76/30* (2018.01)
*H04W 36/14* (2009.01)
*H04W 8/18* (2009.01)

(52) U.S. Cl.
CPC ........... *H04W 48/18* (2013.01); *H04W 72/08* (2013.01); *H04W 76/25* (2018.02); *H04W 76/30* (2018.02); *H04W 8/18* (2013.01); *H04W 36/0085* (2018.08); *H04W 36/00835* (2018.08); *H04W 36/14* (2013.01)

(56) References Cited

U.S. PATENT DOCUMENTS

| | | | |
|---|---|---|---|
| 2010/0268674 A1* | 10/2010 | Dwyer | H04W 36/0066 706/12 |
| 2012/0164979 A1* | 6/2012 | Bachmann | H04L 63/164 455/411 |
| 2012/0264425 A1* | 10/2012 | Krishnamoorthy | H04W 48/16 455/434 |
| 2012/0322446 A1* | 12/2012 | Ramachandran | H04W 48/18 455/436 |
| 2013/0017805 A1* | 1/2013 | Andre-Jonsson | H04W 36/0066 455/411 |
| 2013/0189987 A1* | 7/2013 | Klingenbrunn | H04W 36/165 455/436 |
| 2013/0331077 A1* | 12/2013 | Mucke | H04W 76/30 455/418 |
| 2014/0146792 A1* | 5/2014 | Andre-Jonsson | H04W 36/14 370/331 |
| 2014/0274059 A1* | 9/2014 | Ramle | H04W 36/08 455/436 |
| 2014/0370894 A1 | 12/2014 | Hosdurg et al. | |
| 2015/0296420 A1* | 10/2015 | Drevon | H04W 48/18 455/436 |
| 2017/0303181 A1* | 10/2017 | Gupta | H04W 36/0079 |
| 2018/0199160 A1* | 7/2018 | Edge | H04W 4/029 |
| 2019/0090289 A1* | 3/2019 | Huang-Fu | H04L 67/306 |
| 2019/0116520 A1* | 4/2019 | Chaponniere | H04W 28/06 |
| 2019/0261264 A1* | 8/2019 | Lou | H04W 48/18 |
| 2019/0394719 A1* | 12/2019 | Soliman | H04W 48/18 |
| 2020/0015158 A1* | 1/2020 | So | H04W 48/16 |

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.1.0, 3GPP Organizational Partners, Sep. 2017, 397 pages.

Author Unknown, "Technical Specification Group Services and System Aspects; System Architecture for the 5G System; Stage 2 (Release 15)," Technical Specification 23.501, Version 1.4.0, 3GPP Organizational Partners, Sep. 2017, 151 pages.

Author Unknown, "Technical Specification Group Services and System Aspects; Procedures for the 5G System; Stage 2 (Release 15)," Technical Specification 23.502, Version 1.2.0, 3GPP Organizational Partners, Sep. 2017, 165 pages.

Author Unknown, "Technical Specification Group Radio Access Network; NG-RAN; NG Application Protocol (NGAP) (Release 15)," Technical Specification 38.413, Version 15.0.0, 3GPP Organizational Partners, Jun. 2018, 264 pages.

Qualcomm Incorporated, et al., "S2-177830: TS 23.501: Network sharing in NG-RAN (OI#25)," Third Generation Partnership Project (3GPP), SA WG2 Meeting #123, Oct. 23-27, 2017, 12 pages, Ljubljana, Slovenia.

International Search Report and Written Opinion for International Patent Application No. PCT/EP2018/075033, dated Dec. 21, 2018, 14 pages.

* cited by examiner

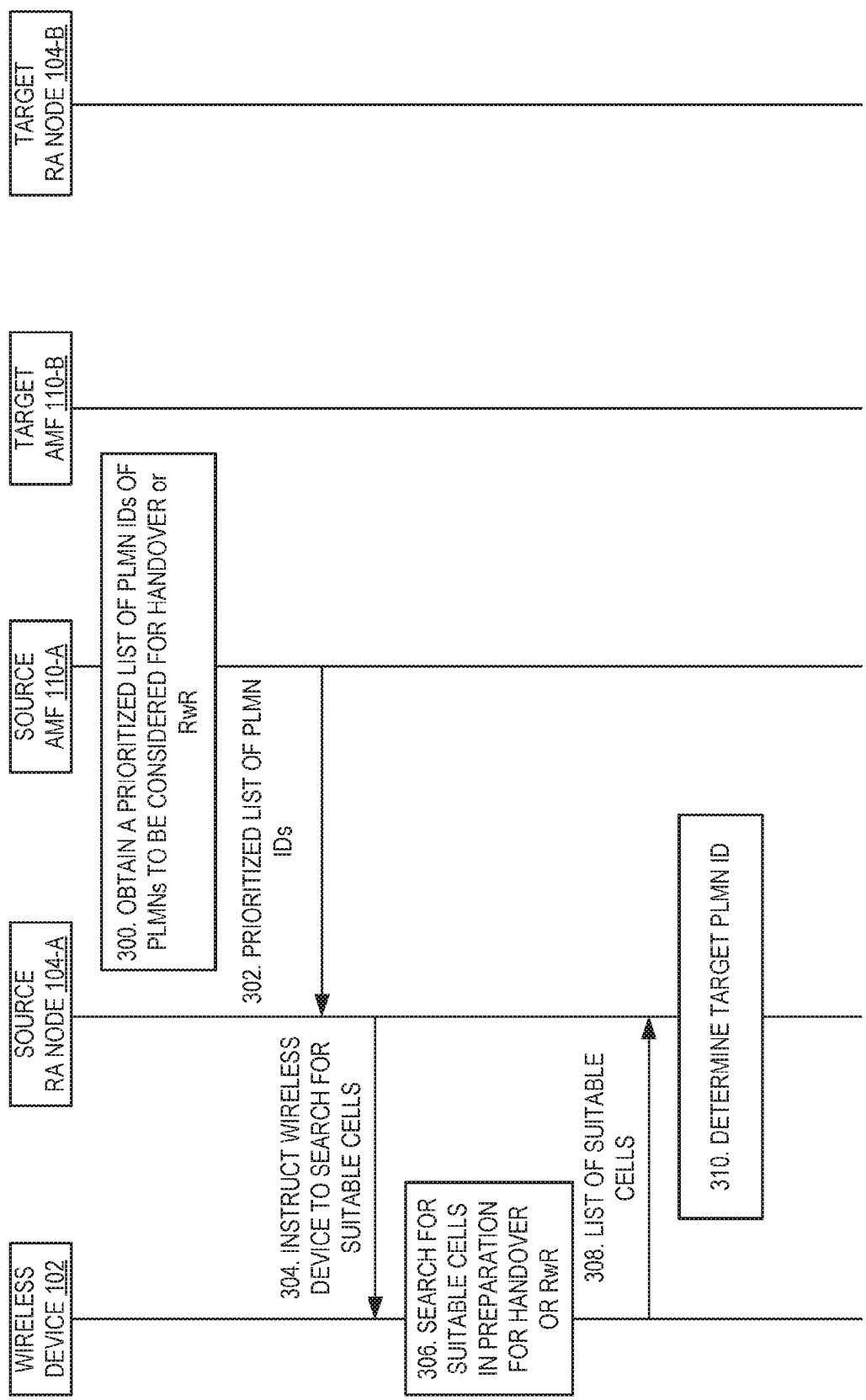

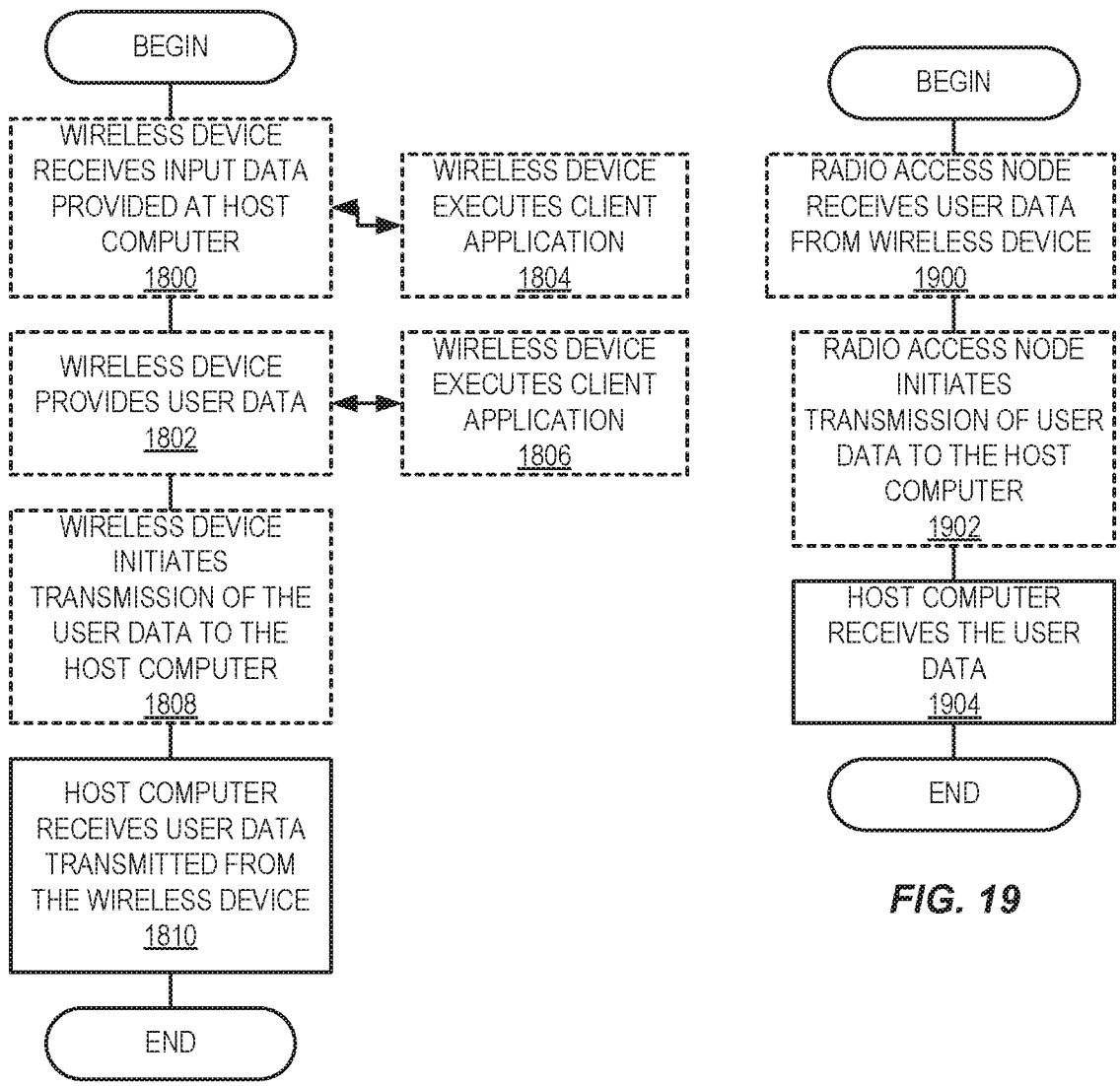

NODES AND METHOD FOR DETERMINING TARGET PLMN ID AND TARGET CELL ID

This application is a 35 U.S.C. § 371 national phase filing of International Application No. PCT/EP2018/075033, filed Sep. 17, 2018, which claims the benefit of U.S. Provisional Application No. 62/582,412, filed Nov. 7, 2017, the disclosures of which are incorporated herein by reference in their entireties.

TECHNICAL FIELD

Embodiments herein relate generally to a radio access node, a method implemented in the radio access node, a core network node, a method implemented in the core network node, a communication system and a method implemented in the communication system. More particularly the embodiments herein relate to a shared network and to selection of a target Public Land Mobile Network (PLMN).

BACKGROUND

As part of the Fifth Generation (5G) work in Third Generation Partnership Project (3GPP), it has been agreed that (see 3GPP Technical Specification (TS) 23.501 v1.4.0 clause 5.18 Network Sharing):

"A network sharing architecture shall allow multiple participating operators to share resources of a single shared network according to agreed allocation schemes. The shared network includes a radio access network. The shared resources include radio resources.

The shared network operator allocates shared resources to the participating operators based on their planned and current needs and according to service level agreements. The shared resources are allocated separately for each participating operator and for signalling traffic and user data traffic within each participating operator. When there is a need for additional resources for a participating operator, the shared network operator may allocate available shared resource to the participating operator according to the service level agreement.

A UE that has a subscription to a participating network operator shall be able to select this participating network operator while within the coverage area of the shared network and to receive subscribed services from the participating network operator.

NOTE: Network sharing and network slicing features are independent of each other. A Network Slice is defined within a PLMN, while network sharing is performed among different PLMNs."

This clause has furthermore been updated in 3GPP meeting #123 by the agreed Change Request (CR) S2-177830 and within that CR the following added clause relates to selection of target PLMN at handover into a shared network:

"5.18.4 Network Selection in Handover Procedure

The NG-RAN uses the selected PLMN (provided by the UE at RRC establishment, or, provided by the AMF/source NG-RAN at N2/Xn handover) to select target cells for future handovers (and radio resources in general) appropriately.

In the case of handover to a shared network:
  The NG-RAN selects a target PLMN based on either (1) PLMN in use (2), pre-configuration, or (3) the EPLMN list in the Handover Restriction List provided by the AMF.
  For Xn based HO procedure, Source NG-RAN indicates a selected PLMN ID to the target NG-RAN by using target cell ID.
  For N2 based HO procedure, the NG-RAN indicates a selected PLMN ID to the AMF as part of the TAI sent in the HO required message. Source AMF uses the TAI information supplied by the source NG-RAN to select the target AMF/MME. The source AMF should forward the selected PLMN ID to the target AMF/MME. The target AMF/MME indicates the selected PLMN ID to the target NG-RAN/eNB so that the target NG-RAN/eNB can select target cells for future handover appropriately."

The Handover Restriction List (HRL) mentioned above is an example of a restriction list. Another example of a restriction list is a Mobility Restriction List (MRL) which is a term used by the signaling between the Access and Mobility Management Functions (AMF) and the 5G Radio Access Network (RAN) at the N2 interface, as specified by 3GPP TS 38.413 v15.0.0 (2018-06)

Release with Redirect (RwR) is a feature for releasing a wireless device, e.g. a User Equipment (UE); from one PLMN and redirecting it to another PLMN. For example, a wireless device can be released from a non-Long Term Evolution (LTE) radio access network and redirected to a LTE radio access network. The RwR may be seen as an alternative to a handover or as a special case of handover. The RwR and handover may also be described as relocation of the wireless device.

The current solution in 3GPP is based on a target PLMN (TPLMN) selection at handover to a shared 5G RAN performed entirely by a source Next Generation RAN (NG-RAN). It is also assumed that whenever the current serving PLMN is available at the target location then the best choice is always to select the same PLMN for the target location. It is moreover assumed that the source RAN always has the best information to make the selection of the target PLMN.

However, consider the situation of a wireless device roaming in a visited PLMN (VPLMN) in a shared or non-shared network. The wireless device is in connected mode and handover is trigged from the RAN to a shared target network. If now the target network is shared by the wireless device's home operator, e.g. Home PLMN (HPLMN), as well as the operator currently serving the wireless device, e.g. the VPLMN, then by applying the logic above, the wireless device would, at the target location, be served by a VPLMN although the wireless device's home operator is an available option and very well could have served the wireless device. A further complication is that each sharing operator in a shared network may use PLMN specific values for the broadcast identity Tracking Area Code (TAC) component of the full identifier Tracking Area Identity (TAI), and the broadcast Cell Identity (CI) component of the full identifier Cell Global Identity (CGI). For a source Core Network (CN) to select a preferred target PLMN and indicate correct values of TAI and CGI would require the source core network to be provided with information about all operator specific values for adjacent networks that are valid as targets for handover.

Therefore, there is a need to at least mitigate or solve this issue.

SUMMARY

An objective of embodiments herein is therefore to obviate at least one of the above disadvantages and to provide improved determination of target PLMN Identity (ID) and target cell ID.

According to a first aspect, the object is achieved by a method implemented in a radio access node. The radio access node receives, from a core network node, a list of prioritized PLMN IDs. The list of prioritized PLMN IDs comprises a PLMN ID of a current serving PLMN of a wireless device and one or more PLMN IDs for one or more PLMNs of one or more shared networks. A shared network is a network that serves two or more PLMNs. The radio access node instructs the wireless device to search for suitable cells for handover on at least one PLMN identified in the list of prioritized PLMN IDs, and receives a list of one or more suitable cells for handover from the wireless device. The radio access node determines a target PLMN ID and a target cell ID for handover of the wireless device based on the list of one or more suitable cells received from the wireless device and the list of prioritized PLMN IDs. The radio access node initiates handover of the wireless device to a target cell identified by the target cell ID in the target PLMN identified by the target PLMN ID.

According to a second aspect, the object is achieved by a method implemented in a core network node. The core network node obtains a list of prioritized PLMN IDs. The list of prioritized PLMN IDs comprises a PLMN ID of a current serving PLMN of a wireless device and one or more PLMN IDs for one or more PLMNs of one or more shared networks. The shared network is a shared network for two or more PLMNs. The core network node provides the list of prioritized PLMN IDs to a radio access node.

According to a third aspect, the object is achieved by a radio access node configured to receive, from a core network node, a list of prioritized PLMN IDs. The list of prioritized PLMN IDs comprises a PLMN ID of a current serving PLMN of a wireless device and one or more PLMN IDs for one or more PLMNs of one or more shared networks. A shared network is a network that serves two or more PLMNs. The radio access node is configured to instruct a wireless device to search for suitable cells for handover on at least one PLMN identified in the list of prioritized PLMN IDs, and to receive a list of one or more suitable cells for handover from the wireless device. The radio access node is further configured to determine a target PLMN ID and a target cell ID for handover of the wireless device based on the list of one or more suitable cells received from the wireless device and the list of prioritized PLMN IDs. The radio access node is configured to initiate handover of the wireless device to a target cell identified by the target cell ID in a target PLMN identified by the target PLMN ID.

According to a fourth aspect, the object is achieved by a core network node being configured to obtain a list of prioritized PLMN IDs. The list of prioritized PLMN IDs comprising a PLMN ID of a current serving PLMN of a wireless device and one or more PLMN IDs for one or more PLMNs of one or more shared networks. A shared network is a network that serves two or more PLMNs. The core network node is further configured to provide the list of prioritized PLMN IDs to a radio access node.

According to a fifth aspect, the object is achieved by a method implemented in a communication system including a radio access node, a core network node and a wireless device. The communication system obtains, at the core network node, a list of prioritized PLMN IDs. The list of prioritized PLMN IDs comprises a PLMN ID of a current serving PLMN of the wireless device and one or more PLMN IDs for one or more PLMNs of one or more shared networks. A shared network is a network that serves two or more PLMNs. The communication system provides the list of prioritized PLMN IDs from the core network node to the radio access node. The communication system receives, at the radio access node, the list of prioritized PLMN IDs from the core network node. The communication system instructs, at the radio access node, the wireless device to search for suitable cells for handover on at least one PLMN identified in the list of prioritized PLMN IDs. The communication system receives, at the radio access node, a list of one or more suitable cells for handover from the wireless device. The communication system determines, at the radio access node, a target PLMN ID and a target cell ID for handover of the wireless device based on the list of one or more suitable cells received from the wireless device and the list of prioritized PLMN IDs. The communication system initiates, at the radio access node, handover of the wireless device to a target cell identified by the target cell ID in a target PLMN identified by the target PLMN ID.

According to a sixth aspect, the object is achieved by a communication system comprising a radio access node, a core network node and a wireless device. The core network node being configured to obtain a list of prioritized PLMN IDs. The list of prioritized PLMN IDs comprises a PLMN ID of a current serving PLMN of the wireless device and one or more PLMN IDs for one or more PLMNs of one or more shared networks. A shared network is a network that serves two or more PLMNs. The core network node is configured to provide the list of prioritized PLMN IDs to the radio access node. The radio access node is configured to receive, the list of prioritized PLMN IDs from the core network node, and to instruct the wireless device to search for suitable cells for handover on at least one PLMN identified in the list of prioritized PLMN IDs. The radio access node is configured to receive a list of one or more suitable cells for handover from the wireless device. The radio access node is configured to determine a target PLMN ID and a target cell ID for handover of the wireless device based on the list of one or more suitable cells received from the wireless device and the list of prioritized PLMN IDs. The radio access node is configured to initiate handover of the wireless device to a target cell identified by the target cell ID in a target PLMN identified by the target PLMN ID.

Since the core network node provides the radio access node with a list of prioritized PLMN IDs to be used at handover or optionally at RwR, the radio access node can determine a target PLMN ID and a target cell ID based on suitable cells and the list of prioritized PLMN IDs. Thus, the target PLMN ID is the prioritized PLMN ID and not necessarily the currently served PLMN ID. The wireless device then becomes served by the HPLMN/Equivalent HPLMN (EHPLMN), when this is an available alternative at the target location, and also for the case when the currently served PLMN is also available at the target location. Consequently, the wireless device gets full home network service/features when that is available in a shared network and benefits from use of home network traffic cost, which improves determination of target PLMN ID and target cell ID, and also the handover or RwR of the wireless device.

Embodiments herein afford many advantages, of which a non-exhaustive list of examples follows:

One advantage of the embodiments herein is that operators that use national roaming will, with the use of handover or RwR, be able to make the wireless device to become served by the home operator HPLMN/EHPLMN when that is an available alternative at the target location also for the case when the currently served PLMN is also available at the target location. Another advantage is that by that it is possible to, at handover or RwR, always ensure that the wireless device will not be served as a roamer when the home operator is an alternative in a target shared network.

Another advantage of the embodiments herein is that they enable a wireless device to get full home network service/features when that is available in a shared network and benefit from use of home network traffic cost.

A further advantage of the embodiments herein is that PLMN steering at handover or RwR in line with the embodiments herein is advantageous compared to an idle mode access change at which the wireless device will not immediately change from roaming to the available HPLMN. The 3GPP standard is designed to let the wireless device as an asynchronous activity perform a PLMN search at a configured time interval. The time interval is chosen to balance between the battery cost of repeatedly performing a PLMN search as long as the wireless device remains roaming, and the roaming cost for the home operator and the subscriber and the 3GPP standard specifies a minimum time interval of 6 minutes for this wireless device activity.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which:

FIGS. 3a and 3b illustrate the operation of the wireless communication system to perform a handover or RwR;

FIGS. 16-19 are flowcharts illustrating methods implemented in a communication system including a host computer, a radio access node, and a wireless device.

Figure 1:
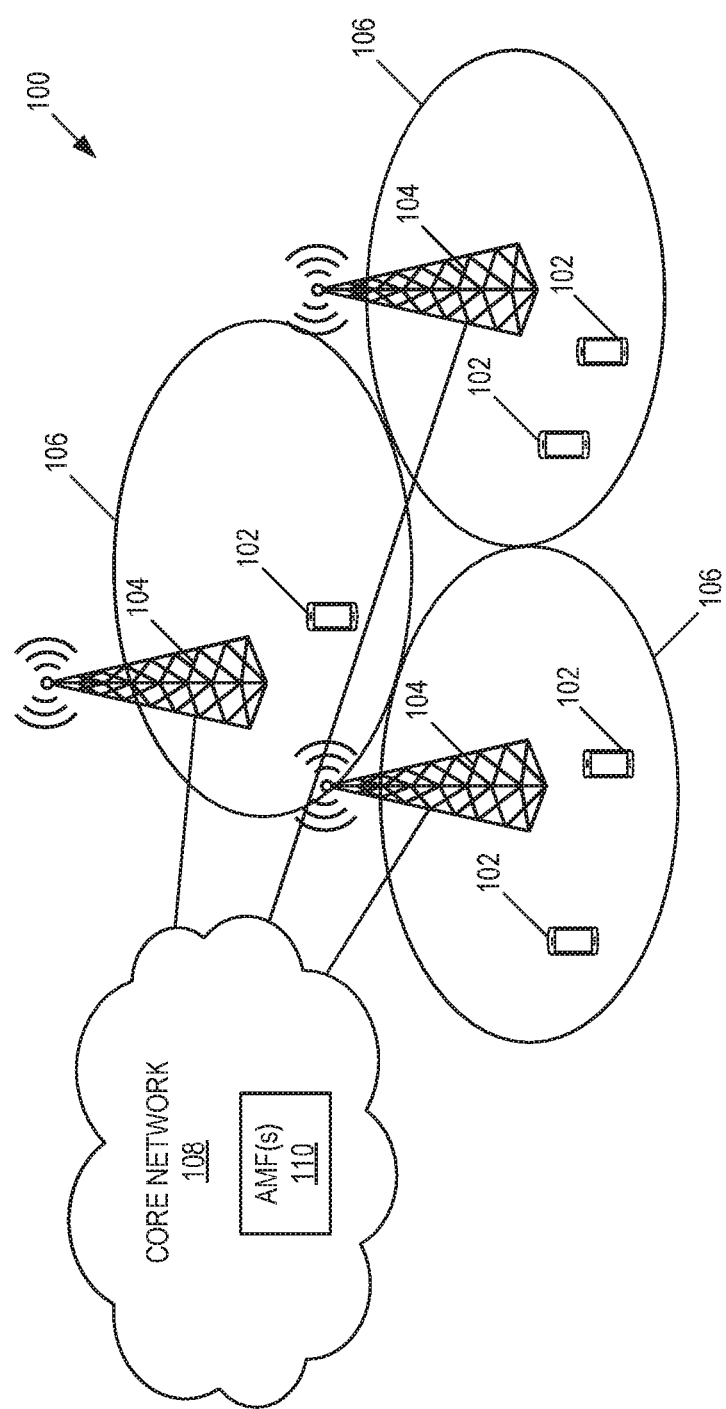
FIG. 1 illustrates an example of a wireless communication system.

The accompanying drawing figures incorporated in and forming a part of this specification illustrate several aspects of the disclosure, and together with the description serve to explain the principles of the disclosure.

The drawings are not necessarily to scale and the dimensions of certain features may have been exaggerated for the sake of clarity. Emphasis is instead placed upon illustrating the principle of the embodiments herein.

DETAILED DESCRIPTION

As mentioned above, the current solution in 3GPP is based on a target PLMN selection at handover to a shared 5G RAN performed entirely by a source NG-RAN. It is also assumed that whenever the current serving PLMN is available at the target location then the best choice is always to select the same PLMN for the target location. It is moreover assumed that the source RAN always has the best information to make the selection of the target PLMN.

However, consider the situation of a wireless device roaming in a VPLMN in a shared or non-shared network. The wireless device is in Connected mode and handover or RwR is trigged from the RAN to a shared target network. If now the target network is shared by the wireless device's home operator, e.g. the HPLMN/EHPLMN, as well as the operator currently serving the wireless device, e.g. the VPLMN, then by applying the logic above the wireless device would, at the target location, be served by a VPLMN although the wireless device's home operator very well could have served the wireless device. A further complication is that each sharing operator in a shared network may use PLMN specific values for the broadcast identity TAC component of the full identifier TAI, and the broadcast CI component of the full identifier CGI. For a source core network to select a preferred target PLMN and indicate correct values of TAI and CGI would require the source core network to be provided with information about all operator specific values for adjacent networks that are valid as targets for handover or RwR. However, with the embodiments herein this is addressed the source core providing the source NG-RAN with a prioritized list of known PLMN identities and leaving it to the NG-RAN to ensure that a selected target PLMN is indicated with the correct operator specific values of TAC and CI to form correct values of target identities TAI and CGI.

At Idle mode mobility and PLMN selection the wireless device is guided by a configuration in priority order of PLMN and Radio Access Technology (RAT) combinations. For the corresponding PLMN selection at Connected mode there is no such priority list. To guide the RAN at PLMN selection at handover or RwR, the core network provides the RAN with an Equivalent PLMN (EPLMN) list including, in addition to the serving PLMN, the PLMNs that are allowed as target PLMNs at handover or RwR. However, the EPLMN list includes no prioritization between the PLMNs or PLMN in combination with access technology in the list. Nor is the serving PLMN prioritized with the PLMN IDs in an EPLMN list.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

FIG. 1 illustrates one example of a wireless communication system 100. While embodiments of the present disclosure are described with respect to the wireless communication system 100 of FIG. 1, the embodiments of the present disclosure are not limited thereto. In FIG. 1, the wireless communication system 100 is a cellular communications network and, in particular, is a 3GPP New Radio (NR) cellular communications network. As such, 3GPP NR terminology is oftentimes used. Note, however, that the concepts disclosed herein are not limited to 3GPP NR.

As illustrated, the wireless communication system 100 includes a number of wireless devices 102, which are also sometimes referred to herein as UEs 102, or wireless communication devices 102. In addition, the wireless communication system 100 includes a RAN that includes a number of radio access nodes 104 serving corresponding coverage areas or cells 106. The radio access node 104 may be e.g. an evolved Node B (eNBs) or next Generation Node B (gNBs). The radio access nodes 104 are also referred to herein as RAN nodes 104, base stations 104 or access nodes. The radio access nodes 104 are connected to a core network 108, which includes a number of core network nodes, as will be appreciated by one of skill in the art. For a 5G NR network, the core network nodes include, for example, multiple AMF(s) 110, as will be appreciated by one of skill in the art. For other network generations, a Mobility Management Entity (MME) and Serving General Packet Radio Services (GPRS) Support Node (SGSN) are examples of the core network nodes.

The wireless communication system 100 includes network nodes forming multiple PLMNs. The PLMNs include multiple PLMNs that share resources of a single shared network, where the shared resources include shared network nodes and shared radio resources, as described above. In addition, the PLMNs may include at least one PLMN that does not use the shared network, but instead uses dedicated network resources of a respective operator. Further, there may be multiple shared networks, each being shared for a respective set of PLMNs. A handover or RwR may be performed from a source network, which may or may not be a shared network, to a target network, which may or may not be a shared network.

Radio access node 104: As used herein, a "radio access node" or "radio network node" is any node in a radio access network of a cellular communications network that operates to wirelessly transmit and/or receive signals. Some examples of a radio access node include, but are not limited to, a base station, a high-power or macro base station, a low-power base station, e.g. a micro base station, a pico base station, a home eNB, or the like, and a relay node. The base station may be e.g. a NR base station, e.g. gNB, in a 3GPP 5G NR network or an eNB in a 3GPP LTE network.

Core network node 108: As used herein, a "core network node" is any type of node in a core network. Some examples of a core network node include, e.g. a MME, an AMF, a Packet Data Network Gateway (P-GW), a Service Capability Exposure Function (SCEF), or the like.

Wireless device 102: As used herein, a "wireless device" refers to a device capable, configured, arranged, and/or operable to communicate wirelessly with network nodes and/or other wireless devices. Unless otherwise noted, the term wireless device may be used interchangeably herein with UE. Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a Voice over Internet Protocol (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A wireless device may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a Machine-to-Machine (M2M) device, which may in a 3GPP context be referred to as a Machine Type Communication (MTC) device. As one particular example, the wireless device may be a wireless device implementing the 3GPP Narrowband IoT (NB-IoT) standard. Particular examples of such machines or devices are sensors, metering devices such as power meters, industrial machinery, home or personal appliances, e.g. refrigerators, televisions, etc. or personal wearables, e.g. watches, fitness trackers, etc. In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Network node: As used herein, a "network node" is any node that is either part of the radio access network or the core network of a cellular communications network/system. In particular, a network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g. administration) in the wireless network. Examples of network nodes include, but are not limited to, Access Points (APs), e.g. radio Aps, and radio access node, e.g. base stations, radio base stations, Node Bs, eNBs, and gNBs. Radio access nodes may be categorized based on supported radio technology, the amount of coverage they provide, or, stated differently, their transmit power level, and may then also be referred to as femto radio access node, pico radio access node, micro radio access node, or macro radio access node. A radio access node may be a relay node or a relay donor node controlling a relay. A network node may also include one or more (or all) parts of a distributed radio access node such as centralized digital units and/or Remote Radio Units (RRUs), sometimes referred to as Remote Radio Heads (RRHs). Such RRUs may or may not be integrated with an antenna as an antenna integrated radio. Parts of a distributed radio access node may also be referred to as nodes in a Distributed Antenna System (DAS). Yet further examples of network nodes include Multi-Standard Radio (MSR) equipment such as MSR radio access node, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g. Mobile Switching Centers (MSCs), MMEs), Operation and Maintenance (O&M) nodes, Operations Support System (OSS) nodes, Self-Organizing Network (SON) nodes, positioning nodes, e.g. Evolved Serving Mobile Location Center (E-SMLCs), and/or Minimization of Drive Tests (MDTs). As another example, a network node may be a virtual network node as described in more detail below. More generally, however, network nodes may represent any suitable device or group of devices capable, configured, arranged, and/or operable to enable and/or provide a wireless device with access to the wireless network or to provide some service to a wireless device that has accessed the wireless network.

It should be noted that the communication links in the wireless communication system 100 may be of any suitable kind including either a wired or wireless link. The link may use any suitable protocol depending on type and level of layer, e.g. as indicated by the Open Systems Interconnection (OSI) model, as understood by the person skilled in the art.

Systems and methods are disclosed herein that relate to selecting a target PLMN for a handover or RwR to a shared network. One example of a process for selecting a target PLMN for a handover or RwR to a shared network and performing the handover or RwR will now be described. Note that while the term "step" is used, the steps may be performed in any desired order unless otherwise explicitly indicated or required.

In the following, the capital letter "A" together with a reference number is used to indicate a source node or function and the capital letter B together with a reference number is used to indicate a target node or function. For example 110-A indicates a source AMF and 104-B indicates a target radio access node.

A method for constructing a HRL sent to the NG-RAN before handover will first be described. Note that the HRL is used as an example of a restriction list, and that the method is also applicable to construction of for example a MRL or any other suitable restriction list for relocation of the UE 101.

Step 1

A source AMF 110-A as seen in FIG. 1 extracts a PLMN ID from a Subscription Permanent Identifier (SUPI) or International Mobile Subscriber Identity (IMSI) of a wireless device 102 or e.g. some other similar permanent wireless device identifier. SUPI is the name for this wireless device identifier in the 5G network architecture. Hereinafter, the description uses SUPI as an example, but the embodiments described herein are not limited thereto. The PLMN ID extracted from the SUPI of the wireless device 102 is a PLMN ID of the home operator of the wireless device 102. Step 1 may be performed upon, e.g. wireless device registration initiation. Note that the source AMF 110-A may be part of a non-shared network or a shared network.

Step 2

The source AMF 110-A matches the PLMN of the SUPI, regardless of if the PLMN of the SUPI is a HPLMN or not, with locally configured PLMN IDs; PLMN IDs which match the PLMN IDs of the shared network to which the operator has Service Level Agreements (SLAs) and for which the operator is able to use handover to reach.

Figure 2:
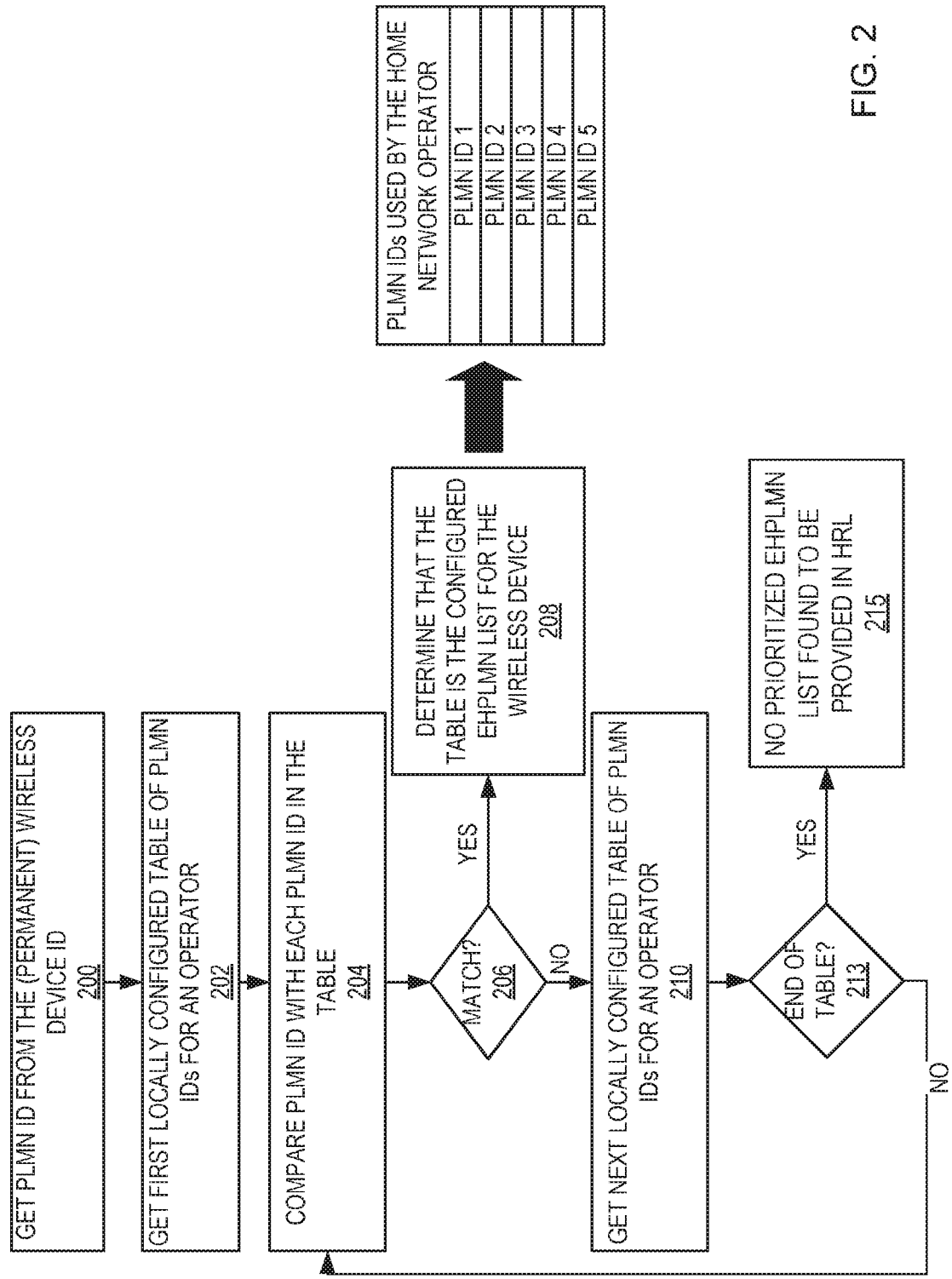
FIG. 2 illustrates one example process for selecting a locally configured EHPLMN list for a wireless device.

In some embodiments, the source AMF 110-A selects a locally configured prioritized EHPLMN list for the PLMN of the SUPI, i.e. a locally configured EHPLMN list for the wireless device 102. A prioritized EHPLMN list refers to that it is prioritized in the sense that all PLMNs in the EHPLMN list is prioritized over a serving PLMN, not being an EHPLMN. An example of a process used by the source AMF 110-A to select a locally configured EHPLMN list for the wireless device 102 is illustrated in FIG. 2. As illustrated in FIG. 2, the source AMF 110-A gets the PLMN ID from the wireless device ID of the wireless device 102, e.g. the SUPI of the wireless device 102 (step 200). The wireless device ID may be a permanent wireless device ID. The source AMF 110-A also gets a first locally configured table of PLMN IDs for an operator (step 202) and compares the PLMN ID obtained from the wireless device ID to PLMN IDs in the table (step 204). If there is a match (step 206, YES), the table is determined to be the configured EHPLMN list for the wireless device 102 (step 208). An example of the table is seen in FIG. 2, where the column represents the PLMN IDs used by the network. Otherwise, if there is not a match (step 206, NO), the source AMF 110-A gets the next locally configured table of PLMN IDs for an operator (step 210). If the end of the table has been reached (step 213, YES), there is no prioritized EHPLMN found to be provided in the HLR (step 215). If the end of table has not been reached (step 213, NO), the process goes back to step 204.

One solution is able to address the use of EHPLMN, i.e. when the PLMN of the SUPI may not be identical with the PLMN IDs broadcast in the target shared network. The source AMF 110-A just needs to find a configured entry for the PLMN of the SUPI and use the configured PLMN IDs of the shared network associated with the PLMN of the SUPI.

An alternative to step 2 may be to use a list of prioritized PLMN combinations received as a part of the subscription data for the wireless device 102. More specifically, in some alternative embodiments, the source AMF 110-A obtains, from a Unified Data Management (UDM), an EHPLMN list for the wireless device 102 as part of the subscription data for the wireless device 102. This EHPLMN list is a list of all HPLMN IDs the home operator uses in home cells. Note that the list of prioritized PLMN/RAT combinations would be new information added to the subscription data.

Step 3

The AMF 110-A takes the PLMN ID(s) from subscription data or the locally configured PLMN ID(s) adding the serving PLMN ID, if not included, and adds them to the Information Element (IE) EPLMN list which is part of the IE HRL, and marks the PLMN ID(s) with their respective priority for selection as a target PLMN for the wireless device 102. The Serving PLMN, which is also included as a separate IE as part of the HRL if the structure of this IE from Fourth Generation (4G) and S1 Application Protocol (S1AP), is reused at a use with a 5G RAN. Note that, in some embodiments, the priorities of the PLMN IDs may be predefined and included in the locally stored list. This list may include the currently served PLMN ID, where in this case the currently served PLMN ID's priority is also defined relative to those of the other PLMN IDs in the list.

Step 4

The 5G RAN, e.g. a source RAN node 104-A, may use the PLMN IDs from the HRL as input at instructing the wireless device 102 to search for suitable cells as a preparation for handover. For example, in some embodiments, conventional procedures are used to search for suitable cells for the wireless device 102 and select a target cell for the handover. Note that the target cell may be for RwR instead of handover. If the selected target cell is in a shared network, e.g.

as determined by the fact that the selected target cell broadcasts multiple PLMN IDs, then a target PLMN ID is selected from among those of the shared network, as described herein.

Step 5

The 5G RAN, e.g. the source RAN node 104-A, receives, e.g. from the wireless device 102, a list with a suitable target cell(s). Here, in this example, the suitable target cell is in a shared network, but is not limited thereto. The cell broadcasts a PLMN ID from the list of prioritized PLMN IDs and may, in addition, broadcast the serving PLMN ID of the wireless device 102.

Step 6

The 5G RAN, e.g. the source RAN node 104-A, determines that the target PLMN ID for the wireless device 102 shall be the prioritized PLMN ID and not the currently serving PLMN ID. As a consequence, it is not possible to perform Xn handover to the target shared network even if the same 5G Core Network (5GC) also serves the shared network. The change of serving PLMN ID requires a use of N2 handover to enable a change of core node(s) and point of wireless device registration in the network from the source roaming network to the shared network and the home operator. N2 is the reference point between the RAN and the AMF.

Step 7

The 5G RAN, e.g. the source RAN node 104-A, uses the TAC associated with the prioritized PLMN ID and constructs a target TAI to indicate the selected PLMN and serving area in the shared network. The 5G RAN, e.g. the source RAN node 104-A, takes the cell ID associated with the selected prioritized PLMN ID and constructs a target RAN ID to indicate the target RAN of the target cell.

Step 8

The source 5G RAN, e.g. the source RAN node 104-A, sends an N2 Handover Required message to the source AMF 110-A. The message includes a handover target which is the combination of the target TAI and the target RAN ID of the target RAN of the target cell, the equivalent information used in the Evolved Packet System (EPS) is the S1AP IE Target ID. The signaling and behavior of step 8 and following steps is handover signaling included for reference and is not part of the present disclosure.

Step 9

The source AMF 110-A uses the target TAI to look up a suitable target core node, e.g. a target AMF 110-B, for N14/N26 signaling of N2-based handover preparation signaling and send a message Forward Relocation Request. N14 is a reference point between two AMFs 110, and N26 is the reference point between the MME and AMF.

Step 10

The receiving target core node, e.g. target AMF 110-B, extracts the target ID from the received message and uses the target RAN ID of the target RAN of the target cell to look up a target RAN node 104-B.

Step 11

The target core node, e.g. the target AMF 110-B, sends a Handover Request to the target RAN node 104-B. The target RAN node 104-B may be a shared RAN node in a 5G system or an EPS. EPS is associated with a 4G system.

Embodiments herein may be used to successfully perform routing to 1) select a prioritized target PLMN ID over the currently served PLMN ID also when the currently served PLMN ID is available at the target location, and 2) make this selection in an environment where the PLMN IDs in the shared network make use of PLMN specific values for cell ID as well as for the TAC.

Figure 3B:
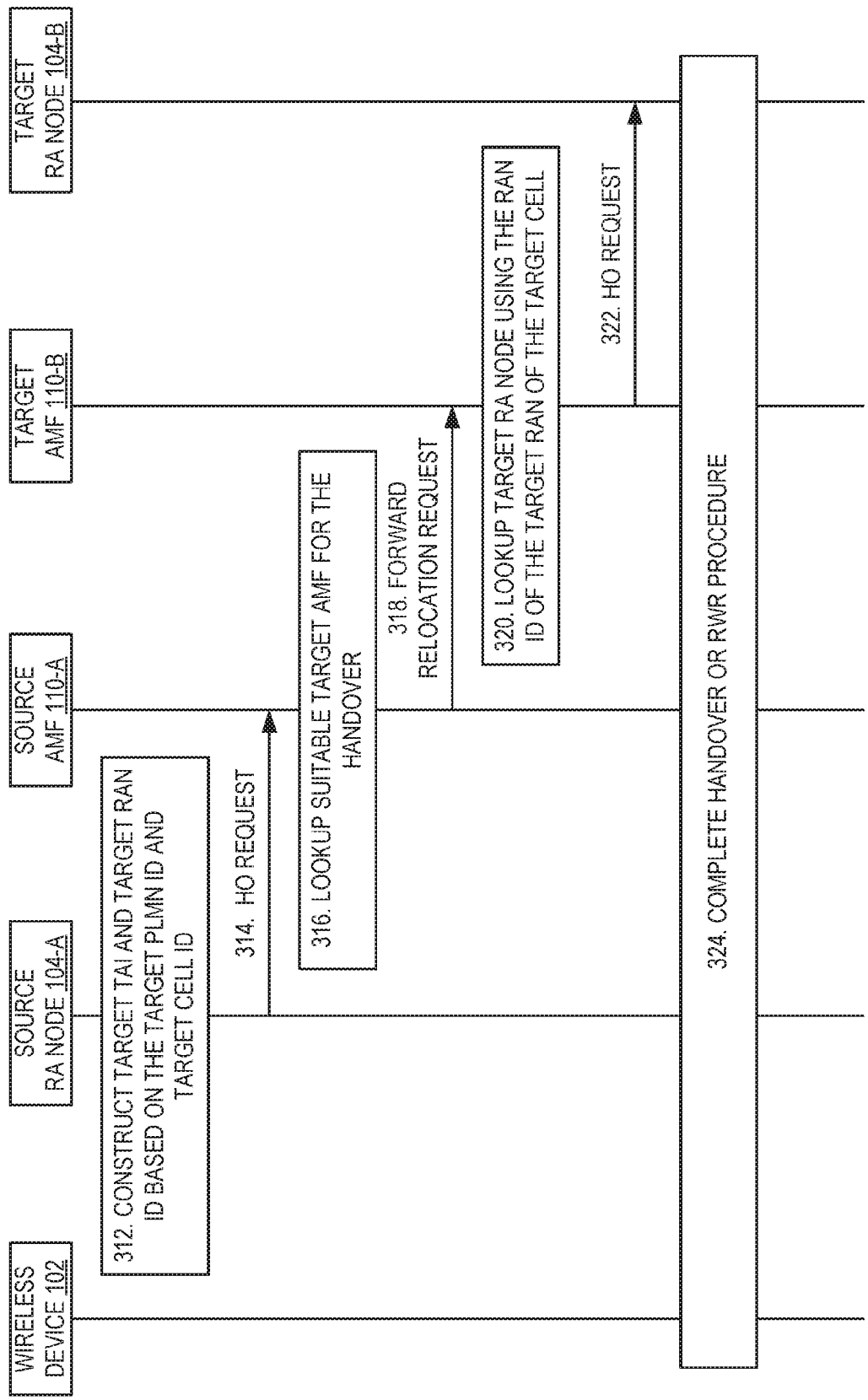

FIG. 3a and FIG. 3b illustrate the operation of the wireless communication system 100 to perform a handover or RwR to a shared network in accordance with at least some of the embodiments described herein. FIG. 3a illustrates steps 300-310 and FIG. 3b illustrates steps 312-324. Steps 300-310 are performed before steps 312-324, i.e. FIG. 3b is a continuation of FIG. 3a. Even though FIGS. 3a and 3b use the AMF as an example of a core network node, the MME and/or SGSN are equally applicable. In case of RwR, steps 312-322 may not be performed. Instead, after step 313 and before step 323. Thus, steps 312-322 are performed only in case of handover.

The method in FIGS. 3a and 3b comprises at least one of the following steps, which steps may be performed in any suitable order than described below:

Step 300

This step is seen in FIG. 3a. As illustrated, the source AMF 110-A obtains a HRL that includes a prioritized list of PLMN IDs of PLMNs to be considered for handover or for RwR. As used herein, a HRL is a HRL that also comprises both PLMN IDs and priority information for the PLMN IDs included in the HRL. Since the HRL comprise a prioritized list of PLMN IDs, the HRL may also be referred to as a prioritized HRL even though not all content in the HRL is necessarily prioritized. The priority information may be explicit, e.g. each PLMN ID is assigned a priority value, or implicit by that PLMN IDs are prioritized by the order in which they appear in the list of PLMN IDs contained in the HRL. The HRL includes the prioritized list of PLMN ID of the current serving PLMN of the wireless device 102 and one or more PLMN IDs of one or more PLMNs in a shared network, which may include a home PLMN of the wireless device 102. In some scenarios, a HPLMN of the wireless device 102 is one of the PLMNs in the shared network. In some embodiments, a PLMN in the shared network is assigned a priority that is higher than the current serving PLMN of the wireless device 102. This is the case where, for example, the HPLMN of the wireless device 102 is one of the PLMNs of the shared network. One example implementation of step 300 is described above with respect to steps 1 through 3.

Note that HLR is just an example, and that a MRL or any other suitable list is equally applicable.

Step 302

This step is seen in FIG. 3a. The source AMF 110-A sends the HRL comprising the prioritized PLMN list to the source radio access node 104-A. Note that while a HRL is used as an example, the PLMN IDs and their respective priorities may be communicated from the core network 108, e.g. from the source AMF 110-A, to the RAN, e.g. to the source radio access node 104-A, in any desired manner.

Step 304

This step is seen in FIG. 3*a*. The source radio access node 104-A uses the HRL comprising the prioritized PLMN list when instructing the wireless device 102 to search for suitable cells for handover or RwR. For example, the source radio access node 104-A may configure the wireless device 102 to search for suitable cells only on the highest priority PLMN. As another example, the source radio access node 104-A may configure the wireless device 102 to search for suitable cells on more than one of the PLMNs identified in the HRL, e.g. N highest priority PLMNs or all PLMNs identified in the HRL, where the source radio access node 104-A then uses the priorities together with a received list of suitable cells to select the target PLMN and the target cell for handover or RwR. N is a positive integer. One example implementation of step 304 is described above with respect to step 4.

Step 306

In preparation for handover or RwR, the wireless device 102 searches for suitable cells on all PLMN IDs in the HRL or on one or more PLMN IDs from the HRL, e.g. as configured by the source radio access node 104-A. The suitable cells may be for example cells for which a measured value, e.g. received power such as, e.g. Reference Signal Received Power (RSRP), is greater than a predefined or configured threshold.

Step 308

This step is seen in FIG. 3*a*. The wireless device 102 reports a list of suitable cells to the source radio access node 104-A.

Step 310

This step is seen in FIG. 3*a*. The source radio access node 104-A determines a target PLMN ID for the handover or RwR. For instance, if the wireless device 102 found a suitable cell for handover or RwR on the highest priority PLMN ID, then the source radio access node 104-A determines that this highest priority PLMN ID is the target PLMN ID for the handover. In this example, the target PLMN is a PLMN in the shared network, e.g. a home PLMN of the wireless device 102, rather than the current serving PLMN. One example implementation of step 310 is described above with respect to step 6.

Step 312

This step is seen in FIG. 3*b*. The source radio access node 104-A constructs a target TAI and target RAN ID based on the target PLMN ID and target cell ID, i.e. the cell ID of the suitable cell found by the wireless device 102 on the target PLMN. One example implementation of step 304 is described above with respect to step 7.

Step 314

This step is seen in FIG. 3*b*. In case of handover, the source radio access node 104-A sends a handover request to the source AMF 110-A. The handover request may e.g. be an N2 Handover Required message. This handover request includes a handover target, which is a combination of the target TAI and the target RAN ID of the target RAN of the target cell, as described above with respect to step 8.

Step 316

This step is seen in FIG. 3*b*. The source AMF 110-A uses the target TAI to lookup a suitable target core network node for the handover. In this example, the suitable target core network node is the target AMF 110-B.

Step 318

This step is seen in FIG. 3*b*. The source AMF 110-A sends a forward relocation request to the target AMF 110-B. The forward relocation request includes the target RAN ID of the target RAN of the target cell for the handover.

Step 320

This step is seen in FIG. 3*b*. The target AMF 110-B extracts the target RAN ID from the forward relocation request and looks up a target radio access node 104-B based on the target RAN ID of the target cell.

Step 322

This step is seen in FIG. 3*b*. The target AMF 110-B sends a handover request to the target radio access node 104-B.

In case of RwR, steps 312-322 may not be performed. Instead, after step 313 and before step 323, a step (not shown in FIG. 3*b*) of that the source radio access node 104-A instructs the wireless device 102 to move to a target cell is performed. Thus, steps 312-322 are performed only in case of handover.

Step 324

This step is seen in FIG. 3*b*. The various network nodes then interact to complete the handover or RwR procedure such that the wireless device 102 is handed over or moved from the source cell in the source PLMN to the target cell in the target PLMN.

Figure 4:
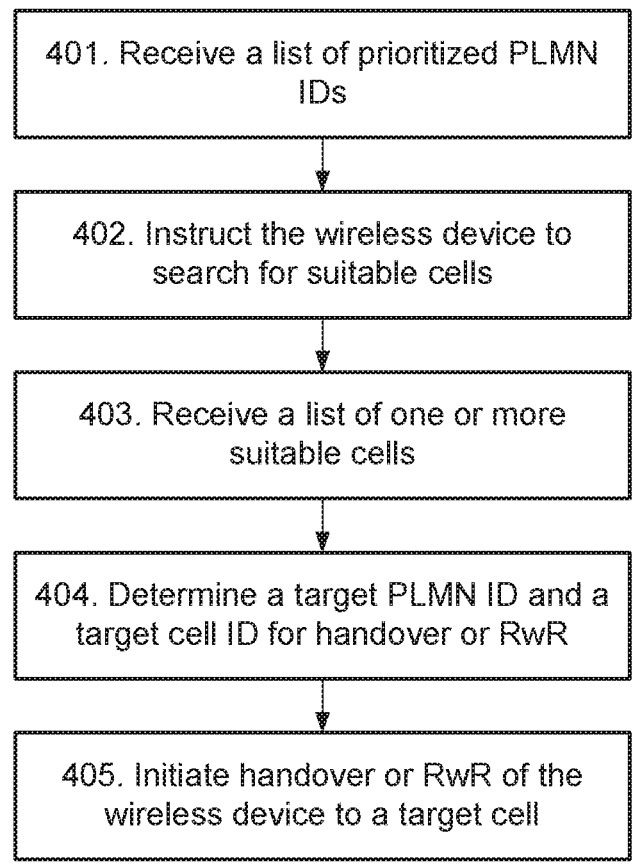
FIG. 4 is a flow chart illustrating an example method performed by a radio access node.

The method described above will now be described seen from the perspective of the radio access node 104. FIG. 4 is a flowchart describing the present method implemented in the radio access node 104. The radio access node 104 may also be referred to as for example an access node or a base station. The method comprises at least one of the following steps to be performed by the radio access node 104, which steps may be performed in any suitable order than described below:

Step 401

This step corresponds to step 302 in FIG. 3*a*. The radio access node 104 receives, from a core network node 110, a list of prioritized PLMN IDs. The list of prioritized PLMN IDs comprises a PLMN ID of a current serving PLMN of a wireless device 102 and one or more PLMN IDs for one or more PLMNs of one or more shared networks. A shared network is a network that serves two or more PLMNs. When the radio network selects a target cell based on radio conditions, and if a non-shared cell is selected there is only one PLMN ID and no prioritizing.

The current serving PLMN of the wireless device 102 may be a VPLMN of the wireless device 102, and the target PLMN for the handover is a target prioritized PLMN of the wireless device 102. A VPLMN may be described as the PLMN on which the wireless device 102 has roamed when leaving its HPLMN. A RwR may be performed instead of a handover.

Within the list of prioritized PLMN IDs, a priority assigned to the target prioritized PLMN of the wireless device 102 may be greater than a priority assigned to the current serving PLMN of the wireless device 102.

The target prioritized PLMN of the wireless device 102 may be a HPLMN of the wireless device 102.

The shared network may be a shared 5G network, a shared 4G network, a shared Third Generation (3G) network or a shared Second Generation (2G) network.

Step 402

This step corresponds to step 304 in FIG. 3a. The radio access node 104 instructs the wireless device 102 to search for suitable cells for handover on at least one PLMN identified in the list of prioritized PLMN IDs. This may also be referred to as the radio access node 104 sending instructions to the wireless device 102 to search for suitable cells.

The handover may comprise a handover and/or a RwR, or a RwR may be performed instead of a handover.

Step 403

This step corresponds to step 308 in FIG. 3a. The radio access node 104 receives a list of one or more suitable cells for handover and/or RwR from the wireless device 102.

Step 404

This step corresponds to step 310 in FIG. 3a. The radio access node 104 determines a target PLMN ID and a target cell ID for handover of the wireless device 102 based on the list of one or more suitable cells received from the wireless device 102 and the list of prioritized PLMN IDs.

Step 405

This step corresponds to steps 312 and 314 in FIG. 3b. In case of handover, the radio access node 104 initiates handover of the wireless device 102 to a target cell identified by the target cell ID in the target PLMN identified by the target PLMN ID. In case of RwR, step 405 will be that the radio access node 104 instructs the wireless device 102 to move to a target cell identified by the target cell ID in the target PLMN identified by the target PLMN ID.

A computer program may comprise instructions which, when executed on at least one processor, cause the at least one processor to carry out the method according to any one of steps 401-405. A carrier may comprise the computer program, and the carrier may be one of an electronic signal, optical signal, radio signal or computer readable storage medium.

Figure 5:
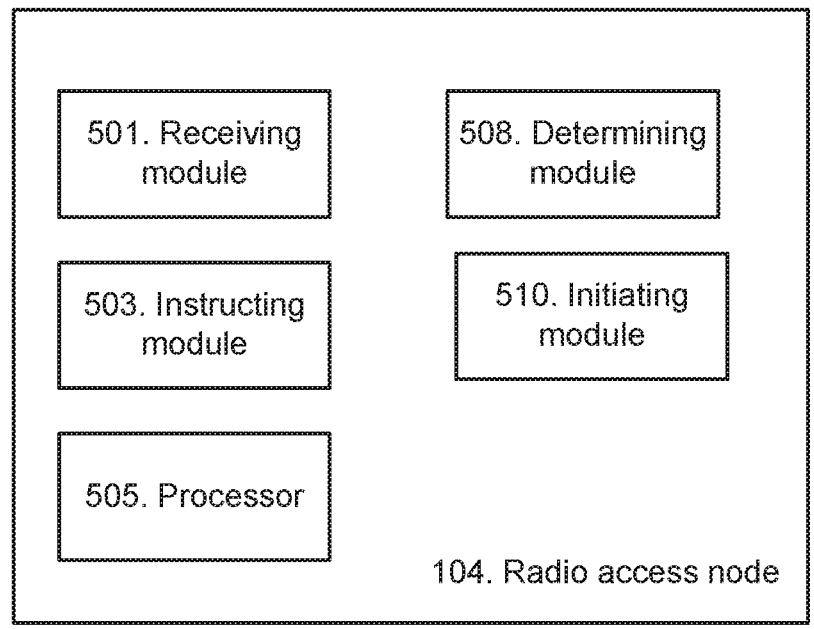
FIG. 5 is a schematic block diagram illustrating an example of a radio access node.

To perform the method steps shown in FIGS. 3 and 4 the radio access node 104 may comprises an arrangement as shown in FIG. 5.

The radio access node 104 configured to, e.g. by means of a receiving module 501, receive, from a core network node 110, a list of prioritized PLMN IDs. The list of prioritized PLMN IDs comprising a PLMN ID of a current serving PLMN of a wireless device 102 and one or more PLMN IDs for one or more PLMNs of one or more shared networks. A shared network is a shared network for two or more PLMNs. The current serving PLMN of the wireless device 102 may be a VPLMN of the wireless device 102, and the target PLMN for the handover may be a target prioritized PLMN of the wireless device 102. A RwR may be performed instead of a handover. Within the list of prioritized PLMN IDs, a priority assigned to the target prioritized PLMN of the wireless device 102 may be greater than a priority assigned to the current serving PLMN of the wireless device 102 The target prioritized PLMN of the wireless device 102 may be a HPLMN of the wireless device 102. The shared network may be a shared 5G network, a shared 4G network, a shared 3G network or a shared 2G network. The receiving module 501 may also be referred to as a receiving unit, a receiving means, a receiving circuit, means for receiving, input unit etc. The receiving module 501 may be a receiver, a transceiver etc. The receiving module 501 may be a wireless receiver of the radio access node 104 of a wireless or fixed communications system.

The radio access node 104 configured to, e.g. by means of an instructing module 503, instruct 304 a wireless device 102 to search for suitable cells for handover on at least one PLMN identified in the list of prioritized PLMN IDs. The instructing module 503 may also be referred to as an instructing unit, an instructing means, an instructing circuit, means for instructing etc. The instructing module 503 may be a processor 505 of the radio access node 104 or comprised in the processor 505 of the radio access node 104.

The radio access node 104 configured to, e.g. by means of the receiving module 501, receive 308 a list of one or more suitable cells for handover from the wireless device 102.

The radio access node 104 configured to, e.g. by means of a determining module 508, determine a target PLMN ID and a target cell ID for handover of the wireless device 102 based on the list of one or more suitable cells received from the wireless device 102 and the list of prioritized PLMN IDs. The determining module 508 may also be referred to as a determining unit, a determining means, a determining circuit, means for determining etc. The determining module 508 may be the processor 505 of the radio access node 104 or comprised in the processor 505 of the radio access node 104.

The radio access node 104 configured to, e.g. by means of an initiating module 510, initiate handover of the wireless device 102 to a target cell identified by the target cell ID in a target PLMN identified by the target PLMN ID. The initiating module 510 may also be referred to as an initiating unit, an initiating means, an initiating circuit, means for initiating etc. The initiating module 510 may be the processor 505 of the radio access node 104 or comprised in the processor 505 of the radio access node 104.

Figure 6:
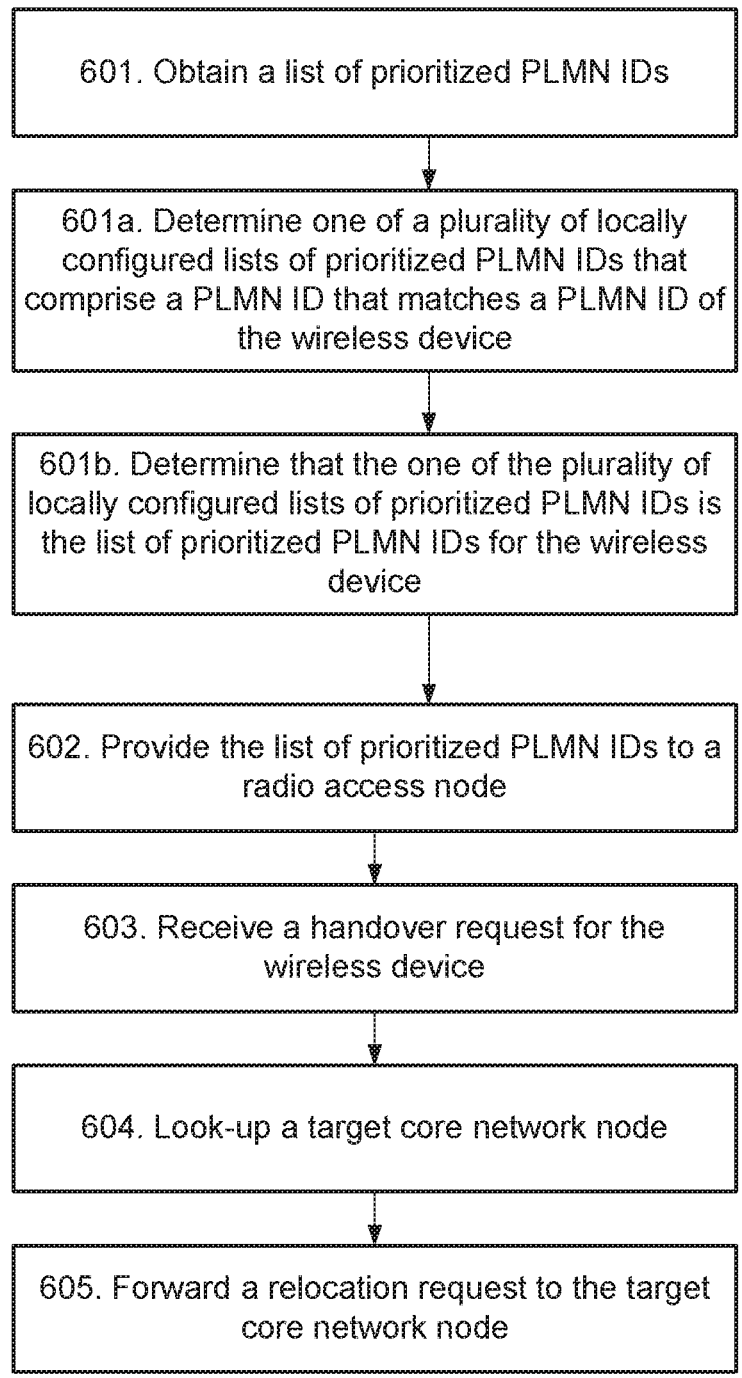
FIG. 6 is a flow chart illustrating an example method performed by a core network node.

The method described above will now be described seen from the perspective of the core network node 110. FIG. 6 is a flowchart describing the present method implemented in the core network node 110. The core network node 110 may also be referred to as for example an AMF, an MME, an SGSN. The method comprises at least one of the following steps to be performed by the core network node 110, which steps may be performed in any suitable order than described below:

Step 601

This step corresponds to step 300 in FIG. 3a. The core network node 110 obtains a list of prioritized PLMN IDs. The list of prioritized PLMN IDs comprises a PLMN ID of a current serving PLMN of a wireless device 102 and one or more PLMN IDs for one or more PLMNs of one or more shared networks. The shared network is a shared network for two or more PLMNs.

The current serving PLMN of the wireless device 102 may be a VPLMN of the wireless device 102, and the target PLMN for the handover may be a target prioritized PLMN of the wireless device 102. A RwR may be performed instead of a handover. The handover may comprise a handover and/or a RwR.

Within the list of prioritized PLMN IDs, a priority assigned to the target prioritized PLMN of the wireless device 102 may be greater than a priority assigned to the current serving PLMN of the wireless device 102.

The target prioritized PLMN of the wireless device 102 may be a HPLMN of the wireless device 102.

Obtaining the list of prioritized PLMN IDs may comprise obtaining the list of prioritized PLMN IDs based on subscription data for the wireless device 102.

The shared network may be a shared 5G network a shared 4G network, a shared 3G network or a shared 2G network.

Step 601a

This step may be a substep of step 601. The core network node 100 may determine one of a plurality of locally configured lists of prioritized PLMN IDs that comprise a PLMN ID that matches a PLMN ID of the wireless device 102. The PLMN ID of the wireless device 102 being obtained from an ID of the wireless device 102. The PLMN ID of the wireless device 102 may be a subscribed PLMN ID. The ID of the wireless device 102 may be a permanent ID of the wireless device 102.

Step 601b

This step may be a substep of step 601 and a step that may be performed after step 601a. The core network node 110 may determine that the one of the plurality of locally configured lists of prioritized PLMN IDs is the list of prioritized PLMN IDs for the wireless device 102.

Step 602

This step corresponds to step 302 in FIG. 3a. The core network node 110 provides the list of prioritized PLMN IDs to a radio access node 104.

Step 603

This step corresponds to step 314 in FIG. 3b. The core network node 110 may receive, from the radio access node 104, a handover request for the wireless device 102. The handover request may comprise information identifying a target PLMN ID from the list of prioritized PLMN IDs and a target RAN of a target cell for the handover.

Step 604

This step corresponds to step 316 in FIG. 3b. The core network node 110 may look-up a target core network node 110 based on the information.

Step 605

This step corresponds to step 318 in FIG. 3b. The core network node 110 may forward a relocation request to the target core network node 110.

Steps 603, 604 and 605 may be applicable for handover, and not necessarily for RwR.

A computer program may comprise instructions which, when executed on at least one processor, cause the at least one processor to carry out the method according to any one steps 601-605. A carrier may comprise the computer program, and the carrier may be one of an electronic signal, optical signal, radio signal or computer readable storage medium.

Figure 7:
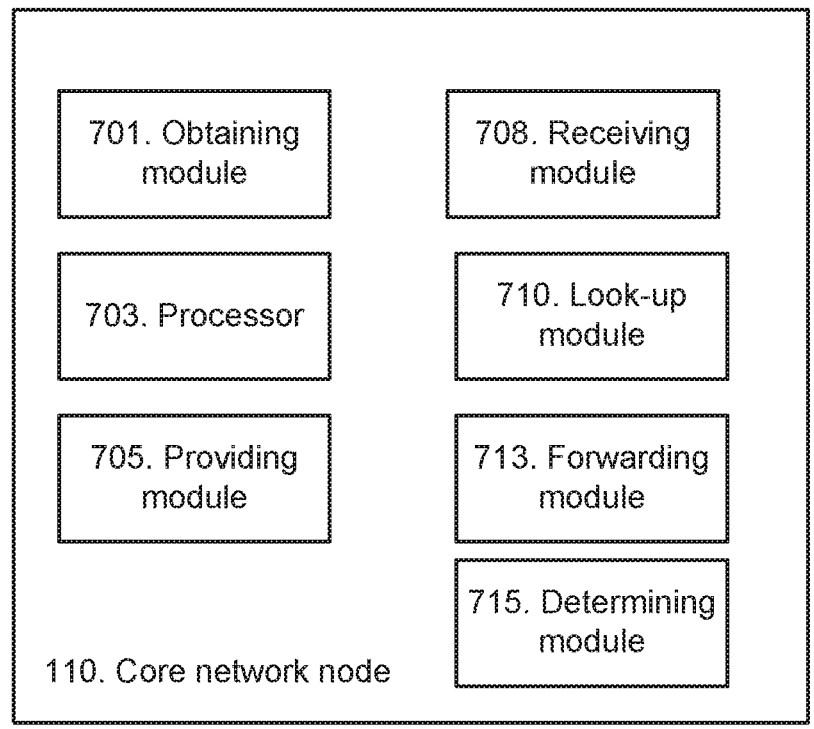
FIG. 7 is a schematic block diagram illustrating an example of a core network node.

To perform the method steps shown in FIGS. 3 and 6 the core network node 110 may comprises an arrangement as shown in FIG. 7.

The core network node 110 is configured to, e.g. by means of an obtaining module 701, obtain a list of prioritized PLMN IDs. The list of prioritized PLMN IDs comprising a PLMN ID of a current serving PLMN of a wireless device 102 and one or more PLMN IDs for one or more PLMNs of one or more shared networks. A shared network is a shared network for two or more PLMNs. The current serving PLMN of the wireless device 102 may be a VPLMN of the wireless device 102, and the target PLMN for the handover is a target prioritized PLMN of the wireless device 102. Within the list of prioritized PLMN IDs, a priority assigned to the target prioritized PLMN of the wireless device 102 may be greater than a priority assigned to the current serving PLMN of the wireless device 102. The target prioritized PLMN of the wireless device 102 may be a HPLMN, of the wireless device 102. The obtaining module 701 may also be referred to as an obtaining unit, an obtaining means, an obtaining circuit, means for obtaining etc. The obtaining module 701 may be a processor 703 of the core network node 110 or comprised in the processor 703 of the core network node 110.

The core network node 110 is configured to, e.g. by means of a providing module 705, provide the list of prioritized PLMN IDs to a radio access node 104. The providing module 705 may also be referred to as a providing unit, a providing means, a providing circuit, means for providing etc. The providing module 705 may be the processor 703 of the core network node 110 or comprised in the processor 703 of the core network node 110.

The core network node 110 may be further configured to, e.g. by means of a receiving module 708, receive, from the radio access node 104, a handover request for the wireless device 102. The handover request may comprise information identifying a target PLMN ID from the list of prioritized PLMN IDs and a target RAN of a target cell for the handover. The receiving module 708 may also be referred to as a receiving unit, a receiving means, a receiving circuit, means for receiving, input unit etc. The receiving module 708 may be a receiver, a transceiver etc. The receiving module 708 may be a wireless receiver of the core network node 110 of a wireless or fixed communications system.

The core network node 110 may be further configured to, e.g. by means of a look-up module 710, look-up a target core network node 110 based on the information. The look-up module 710 may also be referred to as a look-up unit, a look-up means, a look-up circuit, means for look-up etc. The look-up module 710 may be the processor 703 of the core network node 110 or comprised in the processor 703 of the core network node 110.

The core network node 110 may be further configured to, e.g. by means of a forwarding module 713, forward a relocation request to the target core network node 110. The forwarding module 713 may also be referred to as a forwarding unit, a forwarding means, a forwarding circuit, means for forwarding etc. The forwarding module 713 may be the processor 703 of the core network node 110 or comprised in the processor 703 of the core network node 110.

The core network node 110 may be further configured to, e.g. by means of a determining module 715, determine one of a plurality of locally configured lists of prioritized PLMN IDs that comprise a PLMN ID that matches a PLMN ID of the wireless device 102. The PLMN ID of the wireless device 102 may be obtained from an ID of the wireless device 102. The PLMN ID of the wireless device 102 may be a subscribed PLMN ID of the wireless device 102. The ID of the wireless device 102 may be a permanent ID of the wireless device 102. The determining module 715 may also be referred to as a determining unit, a determining means, a determining circuit, means for determining etc. The determining module 715 may be the processor 703 of the core network node 110 or comprised in the processor 703 of the core network node 110.

The core network node 110 may be further configured to, e.g. by means of the determining module 715, determine that the one of the plurality of locally configured lists of prioritized PLMN IDs is the list of prioritized PLMN IDs for the wireless device 102.

The core network node 110 may be further configured to, e.g. by means of the obtaining module 701, in order to obtain the list of prioritized PLMN IDs, to obtain the list of prioritized PLMN IDs based on subscription data for the wireless device 102.

The shared network may be a shared 5G network, a shared 4G network, a shared 3G network or a shared 2G network. The core network node 110 may be an AMF, an MME, an SGSN etc.

Figure 8:
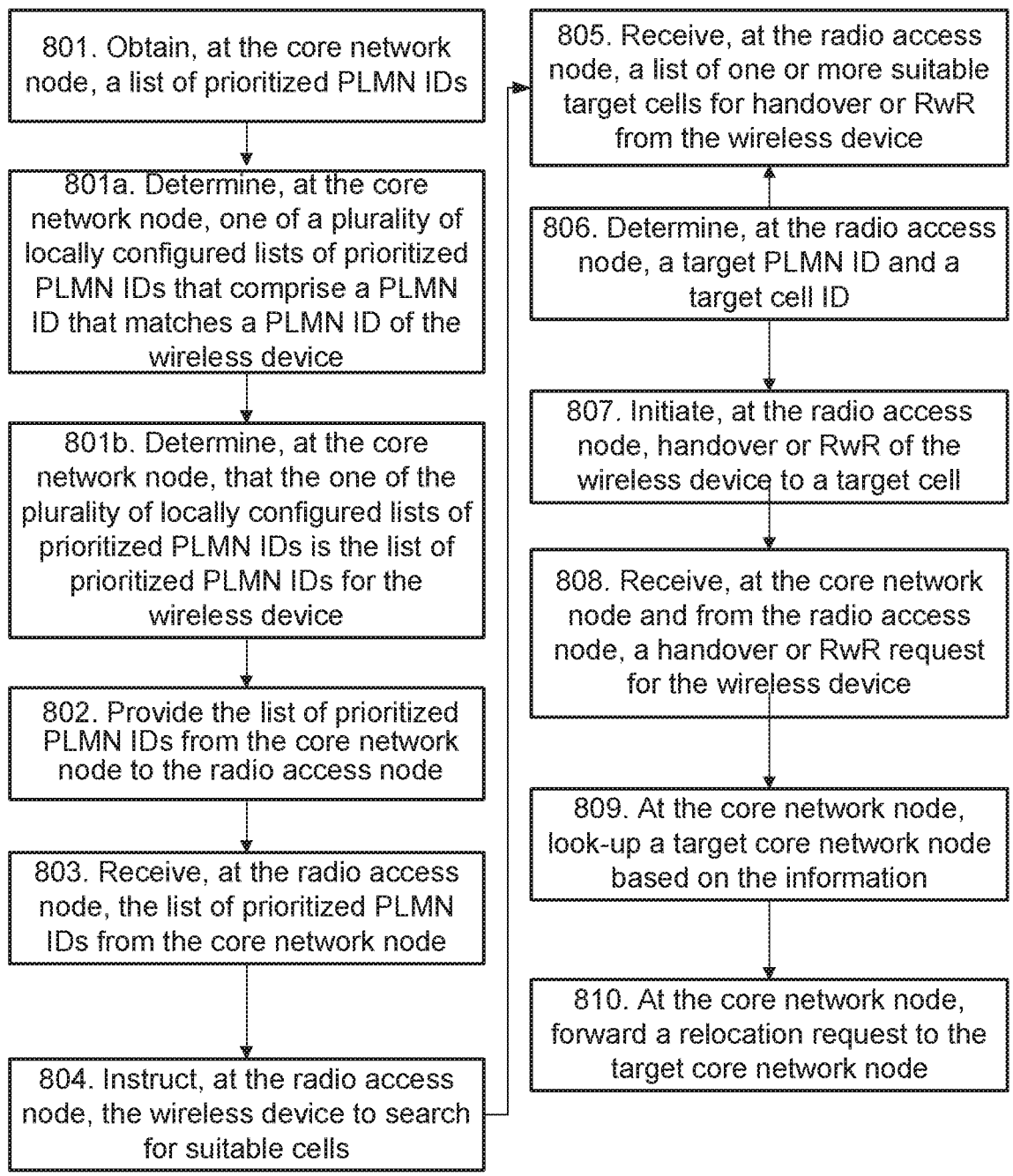
FIG. 8 is a flow chart illustrating an example of a method performed by a communication system.

The method described above will now be described seen from the perspective of the communication system. FIG. 8 is a flowchart describing the present method implemented in the core network node 110. The core network node 110 may also be referred to as for example an AMF. The communication system includes a radio access node 104, a core network node 110 and a wireless device 102. The communication system may further include a host computer providing user data and initiating a transmission carrying the user data to the wireless device 102 via a cellular network comprising the core network node 110 and the radio access node 104. The wireless device 102 may receive the user data from the radio access node 104.

The method in FIG. 8 comprises at least one of the following steps to be performed by the communication system, which steps may be performed in any suitable order than described below:

Step 801

This step corresponds to step 300 in FIG. 3a and step 601 in FIG. 6. The communication system obtains, at the core network node 110, a list of prioritized PLMN IDs. The list of prioritized PLMN IDs comprises a PLMN ID of a current serving PLMN of the wireless device 102 and one or more PLMN IDs for one or more PLMNs of one or more shared networks. A shared network is a shared network for two or more PLMNs.

The current serving PLMN of the wireless device 102 may be a VPLMN of the wireless device 102, and the target PLMN for the handover may be a target prioritized PLMN of the wireless device 102. The handover may comprise a handover and/or a RwR. The RwR may be performed instead of a handover.

Within the list of prioritized PLMN IDs, a priority assigned to the target prioritized PLMN of the wireless device 102 may be greater than a priority assigned to the current serving PLMN of the wireless device 102.

The target prioritized PLMN of the wireless device 102 may be a HPLMN of the wireless device 102.

In order to obtain the list of prioritized PLMN IDs, the communication system may, at the core network node 110, obtain the list of prioritized PLMN IDs based on subscription data for the wireless device 102.

Step 801a

This step corresponds to step 601a in FIG. 6. In order to obtain the list of prioritized PLMN IDs, the communication system may determine, at the core network node 110, one of a plurality of locally configured lists of prioritized PLMN IDs that comprise a PLMN ID that matches a PLMN ID of the wireless device 102. The PLMN ID of the wireless device 102 may be obtained from an ID of the wireless device 102. The PLMN ID of the wireless device 102 may be a wireless PLMN ID of the wireless device 102. The ID of the wireless device 102 may be a permanent ID of the wireless device 102.

Step 801b

This step corresponds to step 601b in FIG. 6. This step may be performed after step 801a. In order to obtain the list of prioritized PLMN IDs, the communication system may determine, at the core network node 110, that the one of the plurality of locally configured lists of prioritized PLMN IDs is the list of prioritized PLMN IDs for the wireless device 102.

Step 802

This step corresponds to step 302 in FIG. 3a and step 602 in FIG. 6. The communication system provides the list of prioritized PLMN IDs from the core network node 110 to the radio access node 104.

Step 803

This step corresponds to step 302 in FIG. 3a and step 401 in FIG. 4. The communication system receives, at the radio access node 104, the list of prioritized PLMN IDs from the core network node 110.

Step 804

This step corresponds to step 304 in FIG. 3a and step 402 in FIG. 4. The communication system instructs, at the radio access node 104, the wireless device 102 to search for suitable cells for handover on at least one PLMN identified in the list of prioritized PLMN IDs.

Step 805

This step corresponds to step 308 in FIG. 3a and step 403 in FIG. 4. The communication system receives, at the radio access node 104, a list of one or more suitable target cells for handover from the wireless device 102. The list of one or more suitable target cells may be for RwR instead of handover.

Step 806

This step corresponds to step 310 in FIG. 3 and step 404 in FIG. 4. The communication system determines, at the radio access node 104, a target PLMN ID and a target cell ID based on the list of one or more suitable cells received from the wireless device 102 and the list of prioritized PLMN IDs. The target PLMN ID and the target cell ID may be for RwR instead of handover.

Step 807

This step corresponds to steps 312 and 314 in FIG. 3*b* and step 405 in FIG. 4. The communication system initiates, at the radio access node 104, handover of the wireless device 102 to a target cell identified by the target cell ID in a target PLMN identified by the target PLMN ID. Instead of a handover, a RwR may be initiated in step 807.

Step 808

This step corresponds to step 314 in FIG. 3*b* and step 603 in FIG. 6. The communication system may receive, at the core network node 110 and from the radio access node 104, a handover request or a RwR request for the wireless device 102. The handover request may comprise information identifying a target PLMN ID from the list of prioritized PLMN IDs and a target RAN of a target cell for the handover or RwR.

Step 809

This step corresponds to step 316 in FIG. 3*b* and step 604 in FIG. 6. The communication system may, at the core network node 110, look-up a target core network node 110 based on the information.

Step 810

This step corresponds to step 318 in FIG. 3*b* and step 605 in FIG. 6. The communication system may, at the core network node 110, forward a relocation request to the target core network node 110.

A computer program may comprise instructions which, when executed on at least one processor, cause the at least one processor to carry out the method according to any one steps 801-810. A carrier may comprise the computer program, and the carrier may be one of an electronic signal, optical signal, radio signal or computer readable storage medium.

To perform the method steps shown in FIGS. 3 and 8 the communication system may comprises an arrangement as shown in FIG. 1.

The communication system comprises a radio access node 104, a core network node 110 and a wireless device 102. The radio access node 104 may be configured to communicate with the wireless device 102. The communication system may include a host computer comprising a processing circuitry configured to provide user data, and a communication interface configured to forward user data to a cellular network for transmission to a wireless device 102 via a core network 108 and the radio access node 104. The core network 108 comprises the core network node 110. The core network node 110 may comprise a network interface and processing circuitry. The processing circuitry of the host computer may be configured to execute a host application, thereby providing the user data. The wireless device's 102 processing circuitry may be configured to execute a client application associated with the host application.

The communication system is configured to, at the core network node 110, obtain a list of prioritized PLMN IDs.

The list of prioritized PLMN IDs comprising a PLMN ID of a current serving PLMN of the wireless device 102 and one or more PLMN IDs for one or more PLMNs of one or more shared networks. A shared network is a network that serves two or more PLMNs. The list of prioritized PLMN IDs may also comprise PLMNs for non-shared networks.

The communication system is configured to, at the core network node 110, provide the list of prioritized PLMN IDs to the radio access node 104.

The communication system is configured to, at the radio access node 104, receive, the list of prioritized PLMN IDs from the core network node 110.

The communication system is configured to, at the radio access node 104, instruct the wireless device 102 to search for suitable cells for handover on at least one PLMN identified in the list of prioritized PLMN IDs.

The communication system is configured to, at the radio access node 104, receive a list of one or more suitable cells for handover from the wireless device 102.

The communication system is configured to, at the radio access node 104, determine a target PLMN ID and a target cell ID for handover of the wireless device 102 based on the list of one or more suitable cells received from the wireless device 102 and the list of prioritized PLMN IDs.

The communication system is configured to, at the radio access node 104, initiate handover of the wireless device 102 to a target cell identified by the target cell ID in a target PLMN identified by the target PLMN ID.

The communication system may be configured to, at the core network node 110, receive, from the radio access node, a handover request for the wireless device 102. The handover request may comprise information identifying a target PLMN ID from the list of prioritized PLMN IDs and a target RAN of a target cell for the handover.

The communication system may be configured to, at the core network node 110, lookup a target core network node 110 based on the information.

The communication system may be configured to, at the core network node 110, forward a relocation request to the target core network node.

The current serving PLMN of the wireless device 102 may be a VPLMN of the wireless device 102, and the target PLMN for the handover may be a target prioritized PLMN of the wireless device 102.

Within the list of prioritized PLMN IDs, a priority assigned to the target prioritized PLMN of the wireless device 102 may be greater than a priority assigned to the current serving PLMN of the wireless device 102.

The target prioritized PLMN of the wireless device 102 may be a HPLMN of the wireless device 102.

In order to obtain the list of prioritized PLMN IDs, the communication system may be configured to, at the core network node's 110 processing circuitry, determine one of a plurality of locally configured lists of prioritized PLMN IDs that comprise a PLMN ID that matches a PLMN ID of the wireless device 102, i.e. matches a PLMN part of e.g. the SUPI. The PLMN ID of the wireless device 102 may be obtained from an ID of the wireless device 102.

The communication system may be configured to, at the core network node's 110 processing circuitry, determine that the one of the plurality of locally configured lists of prioritized PLMN IDs is the list of prioritized PLMN IDs for the wireless device 102.

The ID of the wireless device 102 may be a permanent ID of the wireless device 102.

In order to obtain the list of prioritized PLMN IDs, the communication system may be configured to, at the core network node's 110 processing circuitry, obtain the list of prioritized PLMN IDs based on subscription data for the wireless device 102.

Figure 9:
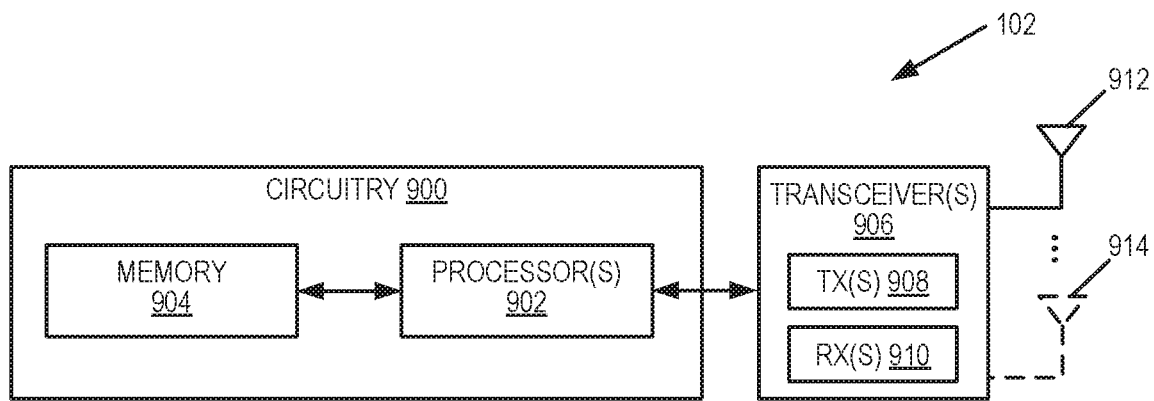
FIGS. 9 and 10 illustrate example embodiments of a wireless device.

FIG. 9 is a schematic block diagram of the wireless device 102, or UE 102, according to some embodiments of the present disclosure. As illustrated, the wireless device 102 includes circuitry 900 comprising one or more processors 902 e.g. Central Processing Units (CPUs), Application Specific Integrated Circuits (ASICs), Field Programmable Gate Arrays (FPGAs), Digital Signal Processors (DSPs), and/or the like, and memory 904. The wireless device 102 also includes one or more transceivers 906 each including one or more transmitters 908 and one or more receivers 910 coupled to one or more antennas 912. In some embodiments, the functionality of the wireless device 102 described herein may be implemented in hardware, e.g. via hardware within the circuitry 900 and/or within the processor(s) 902, or be implemented in a combination of hardware and software, e.g. fully or partially implemented in software that is, e.g. stored in the memory 904 and executed by the processor(s) 902.

In some embodiments, a computer program including instructions which, when executed by the at least one processor 902, causes the at least one processor 902 to carry out at least some of the functionality of the wireless device 102 according to any of the embodiments described herein is provided. In some embodiments, a carrier containing the aforementioned computer program product is provided. The carrier is one of an electronic signal, an optical signal, a radio signal, or a computer readable storage medium, e.g. a non-transitory computer readable medium such as memory.

Figure 10:
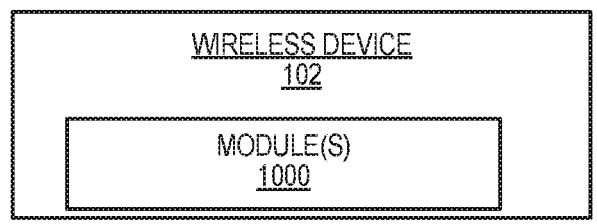

FIG. 10 is a schematic block diagram of the wireless device 102, or UE 102, according to some other embodiments of the present disclosure. The wireless device 102 includes one or more modules 1000, each of which is implemented in software. The module(s) 1000 provide the functionality of the wireless device 102 described herein with respect to, e.g. FIGS. 3a and 3b.

Figure 11:
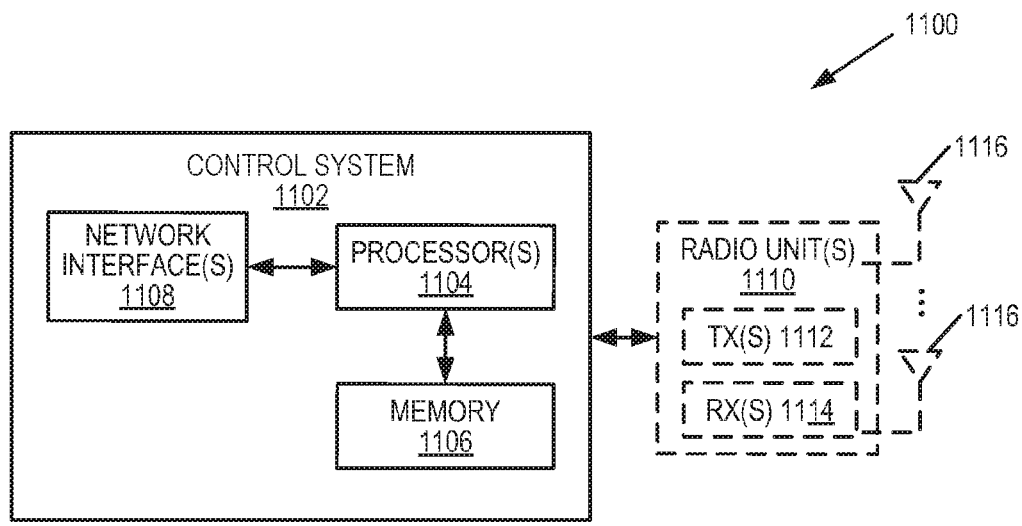
FIG. 11-13 illustrate example embodiments of a network node.

FIG. 11 is a schematic block diagram of a network node 1100, e.g. a RAN node 104 such as, for example, an eNB or gNB or a core network node such as an AMF 110, according to some embodiments of the present disclosure. As illustrated, the network node 1100 includes a control system 1102 that includes circuitry comprising one or more processors 1104, e.g. CPUs, ASICs, DSPs, FPGAs, and/or the like, and memory 1106. The control system 1102 also includes a network interface 1108. In embodiments in which the network node 1100 is a radio access node 104, the network node 1100 also includes one or more radio units 1110 that each include one or more transmitters 1112 and one or more receivers 1114 coupled to one or more antennas 1116. In some embodiments, the functionality of the network node 1100, e.g. the functionality of the RAN node 104 such as, for example, an eNB or gNB or a core network node such as the AMF 110, described above e.g. with respect to FIGS. 3a and 3b may be fully or partially implemented in software that is, e.g. stored in the memory 1106 and executed by the processor(s) 1104.

Figure 12:
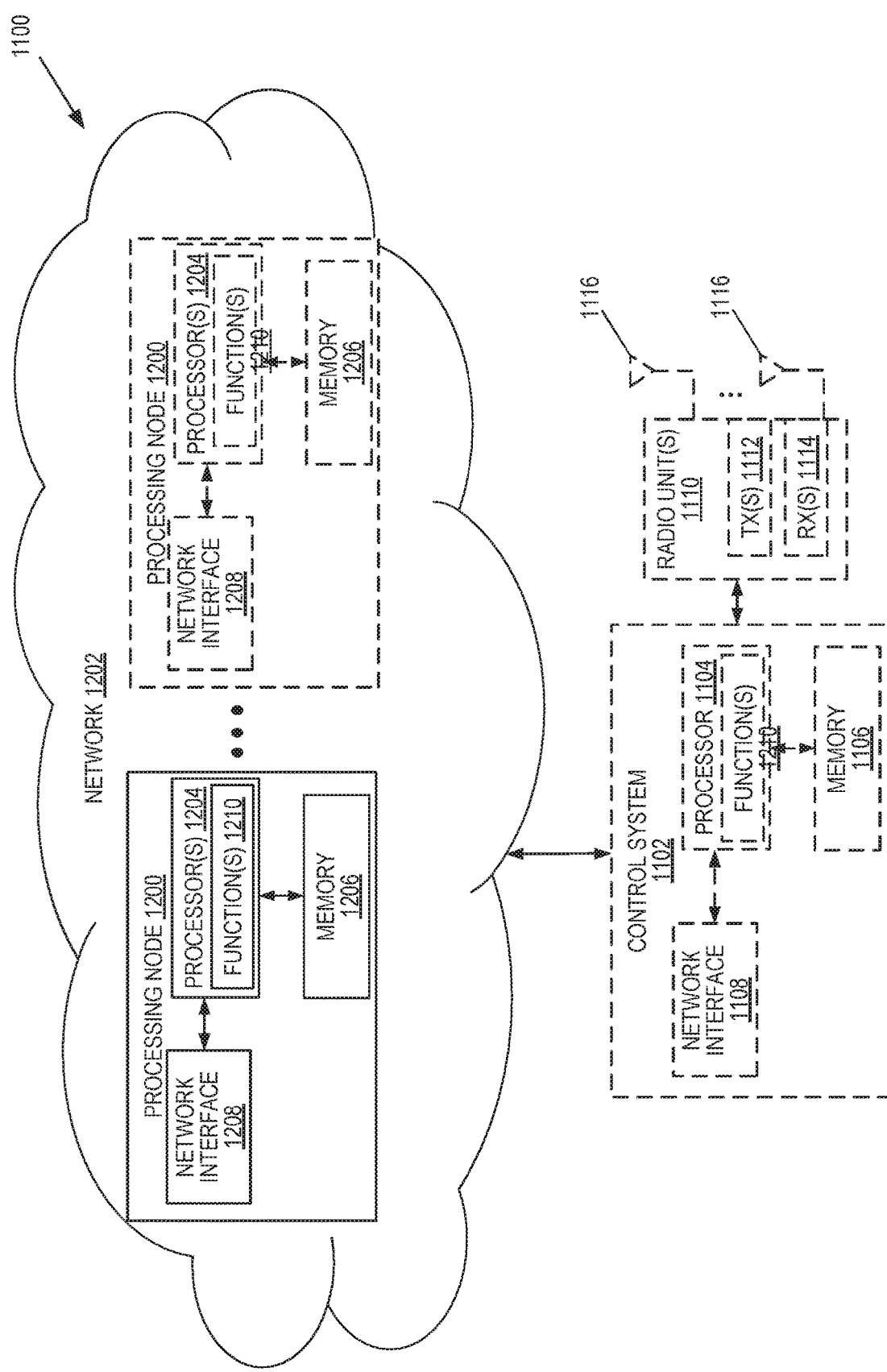

FIG. 12 is a schematic block diagram that illustrates a virtualized embodiment of the network node 1100, e.g. a RAN node 104 such as, for example, an eNB or gNB or a core network node such as an AMF 110, according to some embodiments of the present disclosure. As used herein, a "virtualized" network node 1100 is a network node 1100 in which at least a portion of the functionality of the network node 1100 is implemented as a virtual component, e.g. via a virtual machine(s) executing on a physical processing node(s) in a network(s). As illustrated, the network node 1100 optionally includes the control system 1102, as described with respect to FIG. 11. In addition, if the network node 1100 is a radio access node 104, the network node 1100 also includes the one or more radio units 1110, as described with respect to FIG. 11. The control system 1102, if present, is connected to one or more processing nodes 1200 coupled to or included as part of a network(s) 1202 via the network interface 1108. Alternatively, if the control system 1102 is not present, the one or more radio units 1110, if present, are connected to the one or more processing nodes 1200 via a network interface(s). Alternatively, all of the functionality of the network node 1100 described herein may be implemented in the processing nodes 1200. Each processing node 1200 includes one or more processors 1204, e.g. CPUs, ASICs, DSPs, FPGAs, and/or the like, memory 1206, and a network interface 1208.

In this example, functions 1210 of the network node 1100 described herein, e.g. the functions of a RAN node 104 such as, for example, an eNB or gNB or a core network node such as a AMF 110 described above with respect to, e.g. FIGS. 3a and 3b, are implemented at the one or more processing nodes 1200 or distributed across the control system 1102, if present, and the one or more processing nodes 1200 in any desired manner. In some particular embodiments, some or all of the functions 1210 of the network node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102, if present, or alternatively the radio unit(s) 1110, if present, is used in order to carry out at least some of the desired functions. Notably, in some embodiments, the control system 1102 may not be included, in which case the radio unit(s) 1110, if present, communicates directly with the processing node(s) 1200 via an appropriate network interface(s).

In some particular embodiments, higher layer functionality, e.g. layer 3 and up and possibly some of layer 2 of the protocol stack, of the network node 1100 may be implemented at the processing node(s) 1200 as virtual components, i.e. implemented "in the cloud", whereas lower layer functionality, e.g. layer 1 and possibly some of layer 2 of the protocol stack, may be implemented in the radio unit(s) 1110 and possibly the control system 1102.

In some embodiments, a computer program including instructions which, when executed by the at least one processor 1104, 1204, causes the at least one processor 1104, 1204 to carry out the functionality of the network node 1100 or a processing node 1200 according to any of the embodiments described herein is provided. In some embodiments, a carrier containing the aforementioned computer program product is provided. The carrier is one of an electronic signal, an optical signal, a radio signal, or a computer readable storage medium, e.g. a non-transitory computer readable medium such as the memory 1106, 1206.

Figure 13:
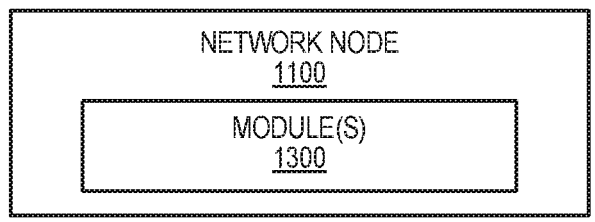

FIG. 13 is a schematic block diagram of the network node 1100 according to some other embodiments of the present disclosure. The network node 1100 includes one or more modules 1300, each of which is implemented in software. The module(s) 1300 provide the functionality of the network node 600 described herein, e.g. the functions of a RAN node 104 such as, for example, an eNB or gNB or a core network node such as an AMF 110 described above with respect to, e.g. FIGS. 3a and 3b.

Figure 14:
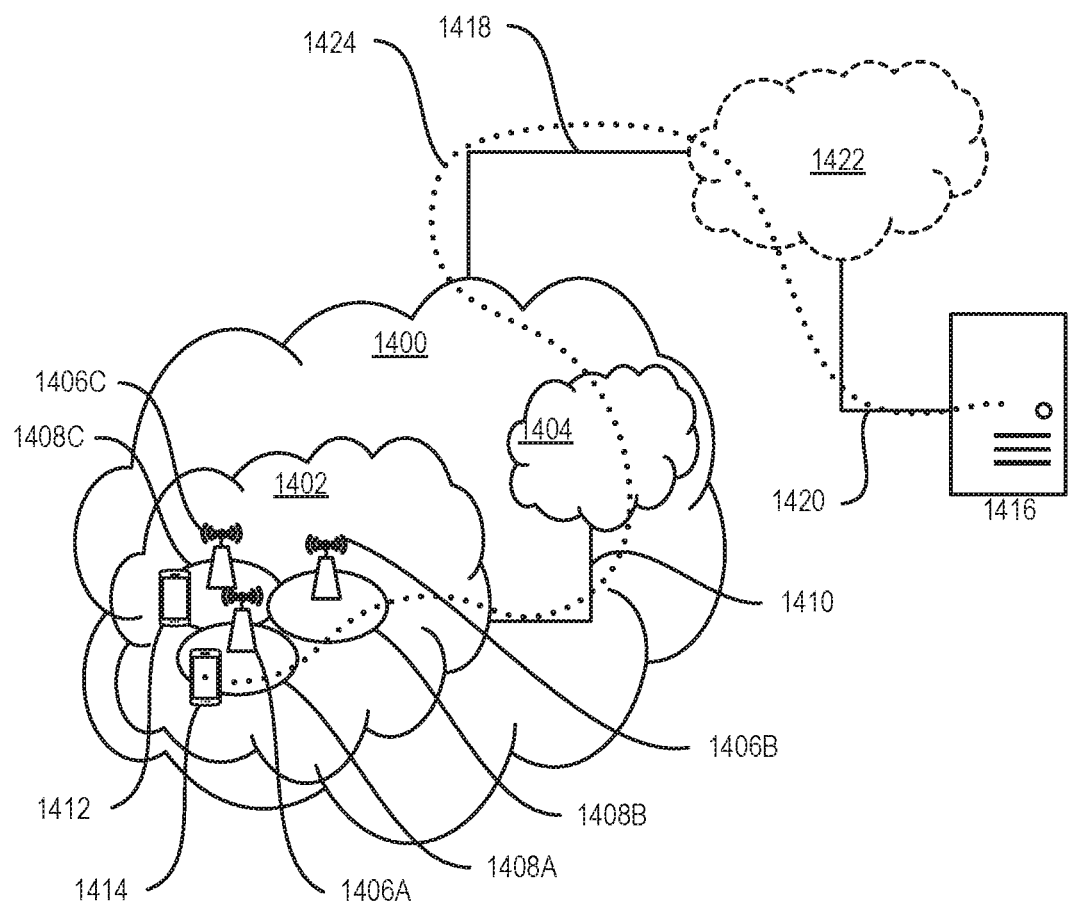
FIG. 14 illustrates a telecommunication network connected via an intermediate network to a host computer.

With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of radio access nodes 1406A, 1406B, 1406C, such as Node Bs, eNBs, gNBs, or other types of wireless APs, each defining a corresponding coverage area 1408A, 1408B, 1408C. Each radio access node 1406A, 1406B, 1406C is connectable to the core network 1404 over a wired or wireless connection 1410. A first wireless device 1412 located in coverage area 1408C is configured to wirelessly connect to, or be paged by, the corresponding radio access node 1406C. A second wireless device 1414 in coverage area 1408A is wirelessly connectable to the corresponding radio access node 1406C. While a plurality of wireless devices 1412, 1414 are illustrated in this example, the disclosed embodiments are equally applicable to a situation where a sole wireless device is in the coverage area or where a sole wireless device is connecting to the corresponding radio access node 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 922. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected wireless devices 1412, 1414 and the host computer 1416. The connectivity may be described as an Over-the-Top (OTT) connection 1424. The host computer 1416 and the connected wireless devices 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the radio access node 1406 may not or need not be informed about the past routing of an incoming downlink communication with data originating from the host computer 1416 to be forwarded, e.g. handed over, to a connected wireless device 1412. Similarly, the radio access node 1406 need not be aware of the future routing of an outgoing uplink communication originating from the wireless device 1412 towards the host computer 1416.

Example implementations, in accordance with an embodiment, of the wireless device, radio access node, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1010, which is stored in or accessible by the host computer 1502 and executable by the processing circuitry 1508. The software 1510 includes a host application 1512. The host application 1512 may be operable to provide a service to a remote user, such as a wireless device 1514 connecting via an OTT connection 1516 terminating at the wireless device 1514 and the host computer 1502. In providing the service to the remote user, the host application 1512 may provide user data which is transmitted using the OTT connection 1516.

The communication system 1500 further includes a radio access node 1518 provided in a telecommunication system and comprising hardware 1520 enabling it to communicate with the host computer 1502 and with the wireless device 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the wireless device 1514 located in a coverage area (not shown in FIG. 15) served by the radio access node 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the radio access node 1518 further includes processing circuitry 1530, which may comprise one or more programmable processors, ASICs, FPGAs, or combinations of these (not shown) adapted to execute instructions. The radio access node 1518 further has software 1532 stored internally or accessible via an external connection.

The communication system 1500 further includes the wireless device 1014 already referred to. The wireless device's 1014 hardware 1534 may include a radio interface 1536 configured to set up and maintain a wireless connection 1526 with a radio access node 1518 serving a coverage area in which the wireless device 1514 is currently located. The hardware 1534 of the wireless device 1514 further includes processing circuitry 1538, which may comprise one or more programmable processors, ASICs, FPGAs, or combinations of these (not shown) adapted to execute instructions. The wireless device 1514 further comprises software 1540, which is stored in or accessible by the wireless device 1514 and executable by the processing circuitry 1538. The software 1540 includes a client application 1542. The client application 1542 may be operable to provide a service to a human or non-human user via the wireless device 1514, with the support of the host computer 1502. In the host computer 1502, the executing host application 1512 may communicate with the executing client application 1542 via the OTT connection 1516 terminating at the wireless device 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
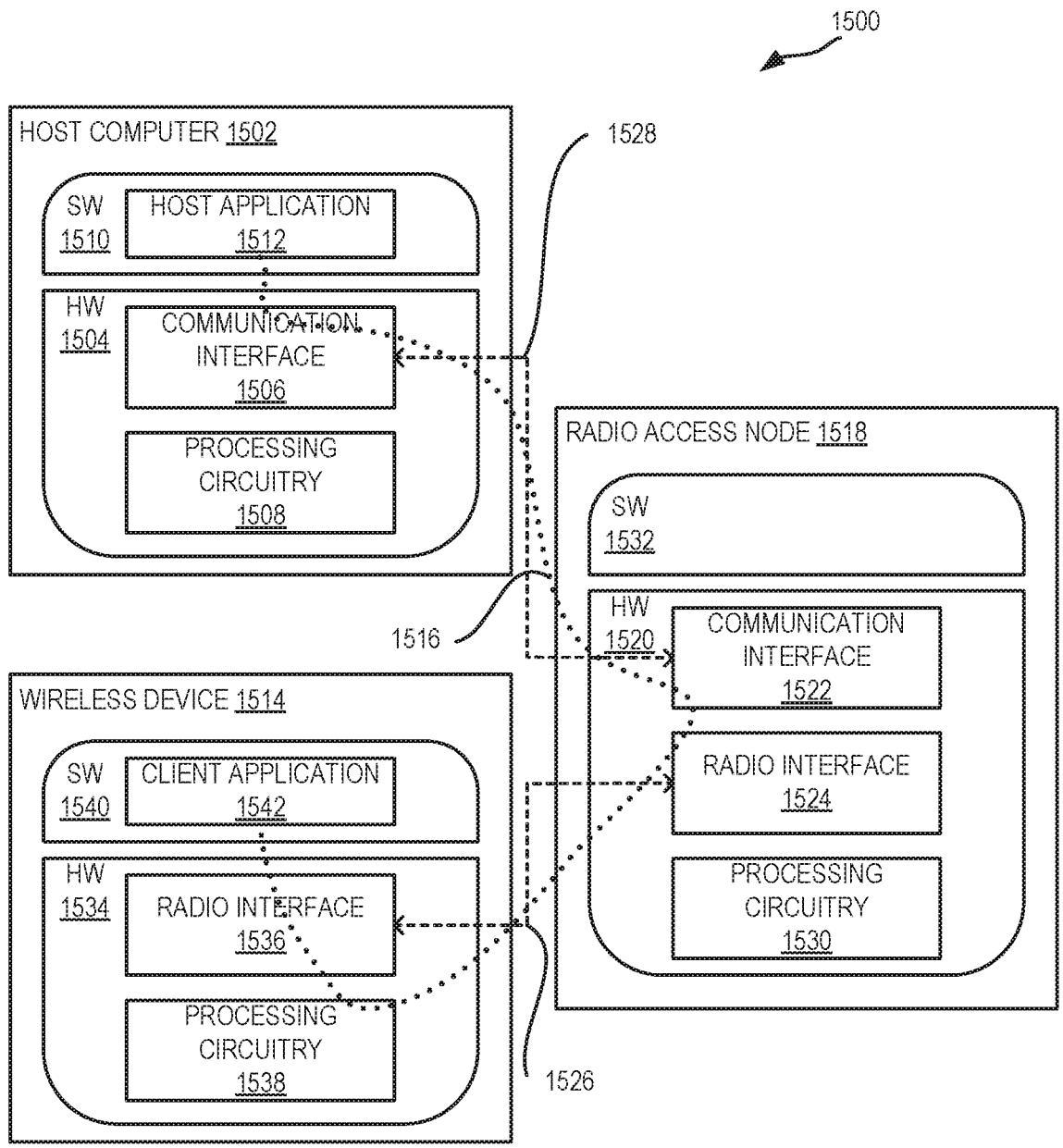
FIG. 15 is a generalized block diagram of a host computer communicating via a radio access node with a wireless device over a partially wireless connection.

It is noted that the host computer 1502, the radio access node 1518, and the wireless device 1514 illustrated in FIG. 15 may be similar or identical to the host computer 1416, one of the radio access nodes 1406A, 1406B, 1406C, and one of the wireless devices 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the wireless device 1514 via the radio access node 1518 without explicit reference to any intermediary devices and the precise routing of messages via these devices. The network infrastructure may determine the routing, which may be configured to hide from the wireless device 1514 or from the service provider operating the host computer 1502, or both. While the OTT connection 1516 is active, the network infrastructure may further take decisions by which it dynamically changes the routing, e.g. on the basis of load balancing consideration or reconfiguration of the network.

The wireless connection 1526 between the wireless device 1514 and the radio access node 1518 is in accordance with the teachings of the embodiments described throughout this disclosure. One or more of the various embodiments improve the performance of OTT services provided to the wireless device 1514 using the OTT connection 1516, in which the wireless connection 1526 forms the last segment. More precisely, the teachings of these embodiments may improve handover and thereby provide benefits such as improved service by handing over to a HPLMN of the wireless device 514 when handing over to a shared network.

A measurement procedure may be provided for the purpose of monitoring data rate, latency, and other factors on which the one or more embodiments improve. There may further be an optional network functionality for reconfiguring the OTT connection 1516 between the host computer 1502 and the wireless device 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the wireless device 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the radio access node 1518, and it may be unknown or imperceptible to the radio access node 1518. Such procedures and functionalities may be known and practiced in the art. In certain embodiments, measurements may involve proprietary wireless device signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Figures 16, 17:
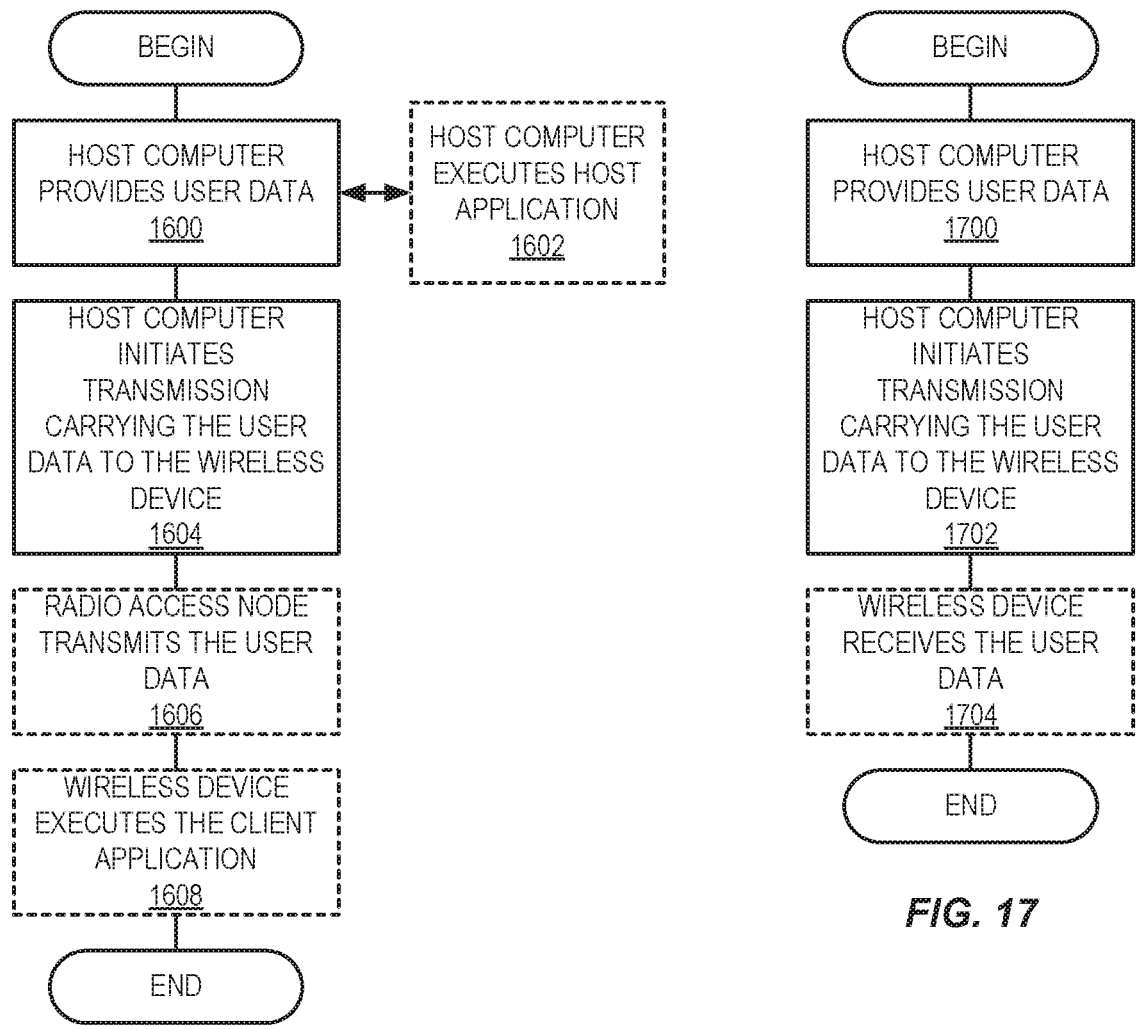

FIG. 16 is a flowchart illustrating a method implemented in a communication system, in accordance with one embodiment. The communication system includes a host computer, a radio access node, and a wireless device which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the wireless device. In step 1606 (which may be optional), the radio access node transmits to the wireless device the user data which was carried in the transmission that the host computer initiated, in accordance with the teachings of the embodiments described throughout this disclosure. In step 1608 (which may also be optional), the wireless device executes a client application associated with the host application executed by the host computer.

FIG. 17 is a flowchart illustrating a method implemented in a communication system, in accordance with one embodiment. The communication system includes a host computer, a radio access node, and a wireless device which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the wireless device. The transmission may pass via the radio access node, in accordance with the teachings of the embodiments described throughout this disclosure. In step 1204 (which may be optional), the wireless device receives the user data carried in the transmission.

FIG. 18 is a flowchart illustrating a method implemented in a communication system, in accordance with one embodiment. The communication system includes a host computer, a radio access node, and a wireless device which may be those described with reference to FIGS. 14 and 15. For simplicity of the present disclosure, only drawing references to FIG. 18 will be included in this section. In step 1800 (which may be optional), the wireless device receives input data provided by the host computer. Additionally or alternatively, in step 1802, the wireless device provides user data. In sub-step 1804 (which may be optional) of step 1800, the wireless device provides the user data by executing a client application. In sub-step 1806 (which may be optional) of step 1802, the wireless device executes a client application which provides the user data in reaction to the received input data provided by the host computer. In providing the user data, the executed client application may further consider user input received from the user. Regardless of the specific manner in which the user data was provided, the wireless device initiates, in sub-step 1808 (which may be optional), transmission of the user data to the host computer. In step 1810 of the method, the host computer receives the user data transmitted from the wireless device, in accordance with the teachings of the embodiments described throughout this disclosure.

FIG. 19 is a flowchart illustrating a method implemented in a communication system, in accordance with one embodiment. The communication system includes a host computer, a radio access node, and a wireless device which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the radio access node receives user data from the wireless device. In step 1902 (which may be optional), the radio access node initiates transmission of the received user data to the host computer. In step 1904 (which may be optional), the host computer receives the user data carried in the transmission initiated by the radio access node.

Summarized, the core network provides the NG-RAN with a prioritization of serving PLMN and the PLMNs in the EPLMN, to be used at handover and/or a Release with Redirect (RwR). The EPLMN list and serving PLMN is currently provided to the RAN as part of the HRL, but there is currently no prioritization between the PLMNs. That can be addressed by the core network providing the NG-RAN with a prioritized list based on the PLMN in the wireless device's SUPI or IMSI or other similar wireless device identifier. One alternative is that the core network provides the NG-RAN with a prioritized list based on a prioritized PLMN/list received as part of the wireless device's subscription data. Another alternative is that the core network uses local configuration in the core network instead of subscription data.

The present disclosure relates to a shared network and, in particular, to selection of a target PLM at handover and/or a RwR to a shared 5G network.

Note that the description given herein focuses on a 3GPP cellular communications system and, as such, 3GPP terminology or terminology similar to 3GPP terminology is oftentimes used. However, the concepts disclosed herein are not limited to a 3GPP system. Note that, in the description herein, reference may be made to the term "cell;" however, particularly with respect to 5G NR concepts, beams may be used instead of cells and, as such, it is important to note that the concepts described herein are equally applicable to both cells and beams.

Those skilled in the art will recognize improvements and modifications to the embodiments of the present disclosure. All such improvements and modifications are considered within the scope of the concepts disclosed herein.

The embodiments herein are not limited to the above described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

The term "at least one of A and B" used herein should be understood to mean "only A, only B, or both A and B".

It should also be emphasised that the steps of the methods defined in the appended claims may, without departing from the embodiments herein, be performed in another order than the order in which they appear in the claims.

The invention claimed is:

1. A method implemented in radio access node, the method comprising:
   receiving, from a core network node, a list of prioritized Public Land Mobile Network (PLMN) Identifiers (IDs) the list of prioritized PLMN IDs comprising a PLMN ID of a current serving PLMN of a wireless device and one or more PLMN IDs for one or more PLMNs of one or more shared networks, wherein a shared network is a network that serves two or more PLMNs;
   instructing the wireless device to search for suitable cells for handover on at least one PLMN identified in the list of prioritized PLMN IDs;
   receiving a list of one or more suitable cells for handover from the wireless device;
   determining a target PLMN ID and a target cell ID for handover of the wireless device based on the list of one or more suitable cells received from the wireless device and the list of prioritized PLMN IDs; and
   initiating handover of the wireless device to a target cell identified by the target cell ID in a target PLMN identified by the target PLMN ID.

2. The method of claim 1, wherein the current serving PLMN of the wireless device is a Visited PLMN (VPLMN) of the wireless device, and the target PLMN for the handover is a target prioritized PLMN of the wireless device.

3. The method of claim 2, wherein, within the list of prioritized PLMN IDs, a priority assigned to the target prioritized PLMN of the wireless device is greater than a priority assigned to the current serving PLMN of the wireless device.

4. The method of claim 2, wherein the target prioritized PLMN of the wireless device is a Home PLMN (HPLMN) of the wireless device.

5. The method of claim 1, wherein a Release with Redirect (RwR) is performed instead of a handover.

6. The method of claim 1, wherein the shared network is a shared Fifth Generation (5G) network, a shared Fourth Generation (4G) network, a shared Third Generation (3G) network or a shared Second Generation (2G) network.

7. A method implemented in a core network node, the method comprising:
   obtaining a list of prioritized Public Land Mobile Network (PLMN) Identifiers (IDs) the list of prioritized PLMN IDs comprising a PLMN ID of a current serving PLMN of a wireless device and one or more PLMN IDs for one or more PLMNs of one or more shared networks, wherein the shared network is a network that serves two or more PLMNs; and
   providing the list of prioritized PLMN IDs to a radio access node.

8. The method of claim 7, further comprising:
   receiving, from the radio access node, a handover request for the wireless device, the handover request comprising information identifying a target PLMN ID from the list of prioritized PLMN IDs and a target Radio Access Network (RAN) of a target cell for the handover;
   looking-up a target core network node based on the information; and
   forwarding a relocation request to the target core network node.

9. The method of claim 7, wherein the current serving PLMN of the wireless device is a Visited PLMN (VPLMN) of the wireless device, and a target PLMN for the handover is a target prioritized PLMN of the wireless device.

10. The method of claim 9, wherein, within the list of prioritized PLMN IDs, a priority assigned to the target prioritized PLMN of the wireless device is greater than a priority assigned to the current serving PLMN of the wireless device.

11. The method of claim 9, wherein the target prioritized PLMN of the wireless device is a Home PLMN (HPLMN) of the wireless device.

12. The method of claim 7, wherein obtaining the list of prioritized PLMN IDs comprises:
    determining one of a plurality of locally configured lists of prioritized PLMN IDs that comprise a PLMN ID that matches a PLMN ID of the wireless device, the PLMN ID of the wireless device being obtained from an ID of the wireless device; and
    determining that the one of the plurality of locally configured lists of prioritized PLMN IDs is the list of prioritized PLMN IDs for the wireless device.

13. The method of claim 12, wherein the ID of the wireless device is a permanent ID of the wireless device.

14. The method of claim 7, wherein obtaining the list of prioritized PLMN IDs comprises obtaining the list of prioritized PLMN IDs based on subscription data for the wireless device.

15. The method of claim 7, wherein a Release with Redirect (RwR) is performed instead of a handover.

16. The method of claim 7, wherein the shared network is a shared Fifth Generation (5G) network a shared Fourth Generation (4G) network, a shared Third Generation (3G) network or a shared Second Generation (2G) network.

17. A radio access node configured to:
    receive, from a core network node, a list of prioritized Public Land Mobile Network (PLMN) Identifiers (IDs) the list of prioritized PLMN IDs comprising a PLMN ID of a current serving PLMN of a wireless device and one or more PLMN IDs for one or more PLMNs of one or more shared networks, wherein a shared network is a network that serves two or more PLMNs;
    instruct a wireless device to search for suitable cells for handover on at least one PLMN identified in the list of prioritized PLMN IDs;
    receive a list of one or more suitable cells for handover from the wireless device;
    determine a target PLMN ID and a target cell ID for handover of the wireless device based on the list of one or more suitable cells received from the wireless device and the list of prioritized PLMN IDs; and
    initiate handover of the wireless device to a target cell identified by the target cell ID in a target PLMN identified by the target PLMN ID.

18. A core network node being configured to:
    obtain a list of prioritized Public Land Mobile Network (PLMN) Identifiers (IDs) the list of prioritized PLMN IDs comprising a PLMN ID of a current serving PLMN of a wireless device and one or more PLMN IDs for one or more PLMNs of one or more shared networks, wherein a shared network is a network that serves two or more PLMNs; and
    provide the list of prioritized PLMN IDs to a radio access node.

19. A method implemented in a communication system including a radio access node, a core network node and a wireless device, the method comprising:
    obtaining, at the core network node, a list of prioritized Public Land Mobile Network (PLMN) Identifiers (IDs) the list of prioritized PLMN IDs comprising a PLMN ID of a current serving PLMN of the wireless device and one or more PLMN IDs for one or more PLMNs of one or more shared networks, wherein a shared network is a network that serves two or more PLMNs;
    providing the list of prioritized PLMN IDs from the core network node to the radio access node;
    receiving, at the radio access node, the list of prioritized PLMN IDs from the core network node;
    instructing, at the radio access node, the wireless device to search for suitable cells for handover on at least one PLMN identified in the list of prioritized PLMN IDs;
    receiving, at the radio access node, a list of one or more suitable cells for handover from the wireless device;
    determining, at the radio access node, a target PLMN ID and a target cell ID for handover of the wireless device based on the list of one or more suitable cells received from the wireless device and the list of prioritized PLMN IDs; and
    initiating, at the radio access node, handover of the wireless device to a target cell identified by the target cell ID in a target PLMN identified by the target PLMN ID.

20. A communication system comprising a radio access node, a core network node and a wireless device,
    the core network node being configured to:
        obtain a list of prioritized Public Land Mobile Network (PLMN) Identifiers (IDs) the list of prioritized PLMN IDs comprising a PLMN ID of a current serving PLMN of the wireless device and one or more PLMN IDs for one or more PLMNs of one or more shared networks, wherein a shared network is a network that serves two or more PLMNs; and
        provide the list of prioritized PLMN IDs to the radio access node, and
    the radio access node being configured to:
        receive, the list of prioritized PLMN IDs from the core network node,
        instruct the wireless device to search for suitable cells for handover on at least one PLMN identified in the list of prioritized PLMN IDs;
        receive a list of one or more suitable cells for handover from the wireless device;
        determine a target PLMN ID and a target cell ID for handover of the wireless device based on the list of one or more suitable cells received from the wireless device and the list of prioritized PLMN IDs; and
        initiate handover of the wireless device to a target cell identified by the target cell ID in a target PLMN identified by the target PLMN ID.

* * * * *

UNITED STATES PATENT AND TRADEMARK OFFICE
CERTIFICATE OF CORRECTION

PATENT NO. : 10,880,792 B2  
APPLICATION NO. : 16/094635  
DATED : December 29, 2020  
INVENTOR(S) : Olsson et al.

Page 1 of 1

It is certified that error appears in the above-identified patent and that said Letters Patent is hereby corrected as shown below:

In the Specification

In Column 5, Line 45, delete "FIG." and insert -- FIGS. --, therefor.

In Column 7, Line 7, delete "base stations 104" and insert -- base stations --, therefor.

In Column 9, Line 2, delete "Evolved Serving Mobile Location Center (E-SMLCs)," and insert -- Evolved Serving Mobile Location Centers (E-SMLCs), --, therefor.

In Column 17, Lines 24-25, delete "core network node 100" and insert -- core network node 110 --, therefor.

In Column 28, Line 31, delete "step 1204" and insert -- step 1704 --, therefor.

In the Claims

In Column 31, Line 20, in Claim 16, delete "network" and insert -- network, --, therefor.

Signed and Sealed this  
Fourth Day of May, 2021

Drew Hirshfeld  
*Performing the Functions and Duties of the  
Under Secretary of Commerce for Intellectual Property and  
Director of the United States Patent and Trademark Office*